United States Patent [19]

Mitchell et al.

[11] Patent Number: 4,888,645
[45] Date of Patent: Dec. 19, 1989

[54] METHOD FOR ENCODING AND DECODING A DIGITAL IMAGE

[75] Inventors: Joan L. Mitchell, Ossining; Karen L. Anderson, Peekskill; Gerald Geortzel, White Plains, all of N.Y.

[73] Assignee: International Business Machines Corporation, Armonk, N.Y.

[21] Appl. No.: 111,957

[22] Filed: Oct. 21, 1987

Related U.S. Application Data

[60] Division of Ser. No. 841,483, Mar. 19, 1986, Pat. No. 4,728,318, which is a continuation-in-part of Ser. No. 571,239, Jan. 16, 1984, abandoned.

[51] Int. Cl.[4] .............................................. H04N 7/12
[52] U.S. Cl. ................................ 358/261.1; 358/261.3
[58] Field of Search ............................ 358/261.1, 261.3

[56] References Cited

U.S. PATENT DOCUMENTS 4,212,036 7/1980 Nakagome et al. ............... 358/261.3
4,558,371 12/1985 Rallapalli ......................... 358/261.3

*Primary Examiner*—Edward L. Coles, Sr.
*Attorney, Agent, or Firm*—Thomas P. Dowd

[57] ABSTRACT

A method for encoding and decoding digital image data, includes the steps of: testing the data for a vertical relationship between adjacent lines of the image; generating directly a reference code word representative of the vertical relationship for each successful test; generating by table lookup a run code word for a stream of data bits of common value for each unsuccessful test whereby a data element representing a number of bits in a code word is stored at a predetermined offset from a table entry for the code word; merging the vertical reference code words and the run code words generated by the above steps to form an encoded data stream; testing the encoded data stream for a reference code; decoding directly the vertical relationship from the reference code for each successful test; decoding by table lookup a run of bits of common value by serial examination of said encoded data stream for each unsuccessful test; and storing data decoded by the above steps in a predetermined relationship. A fast algorithm for modifying an image in run representation form before encoding or after decoding is also described.

33 Claims, 15 Drawing Sheets

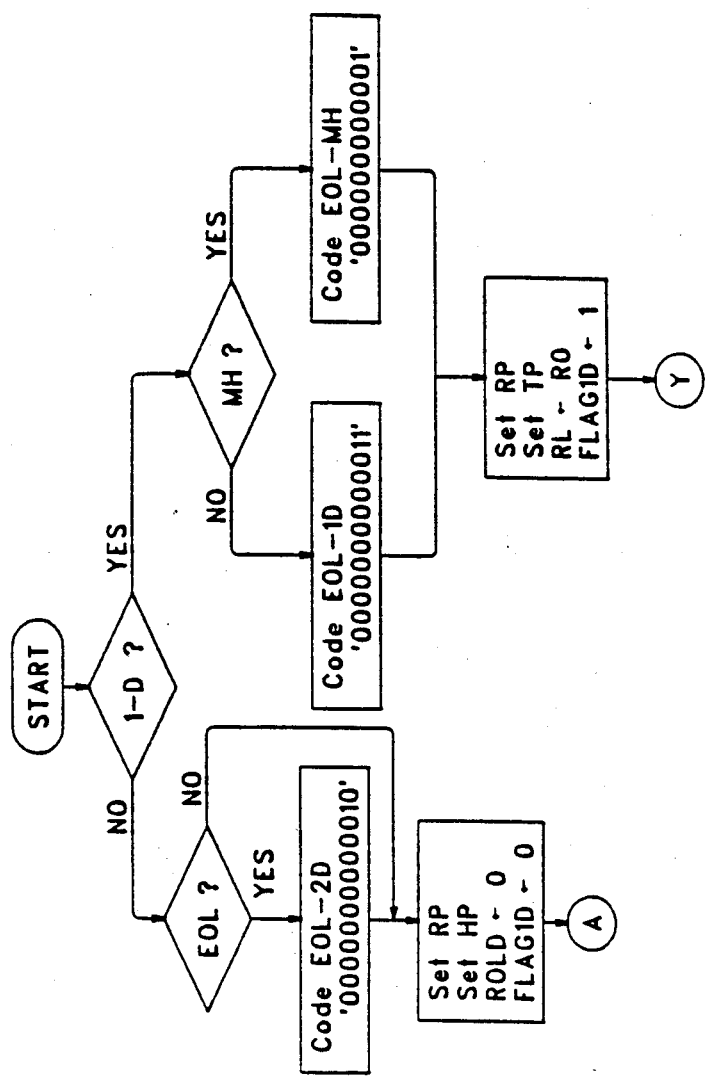
FIG. 2.1

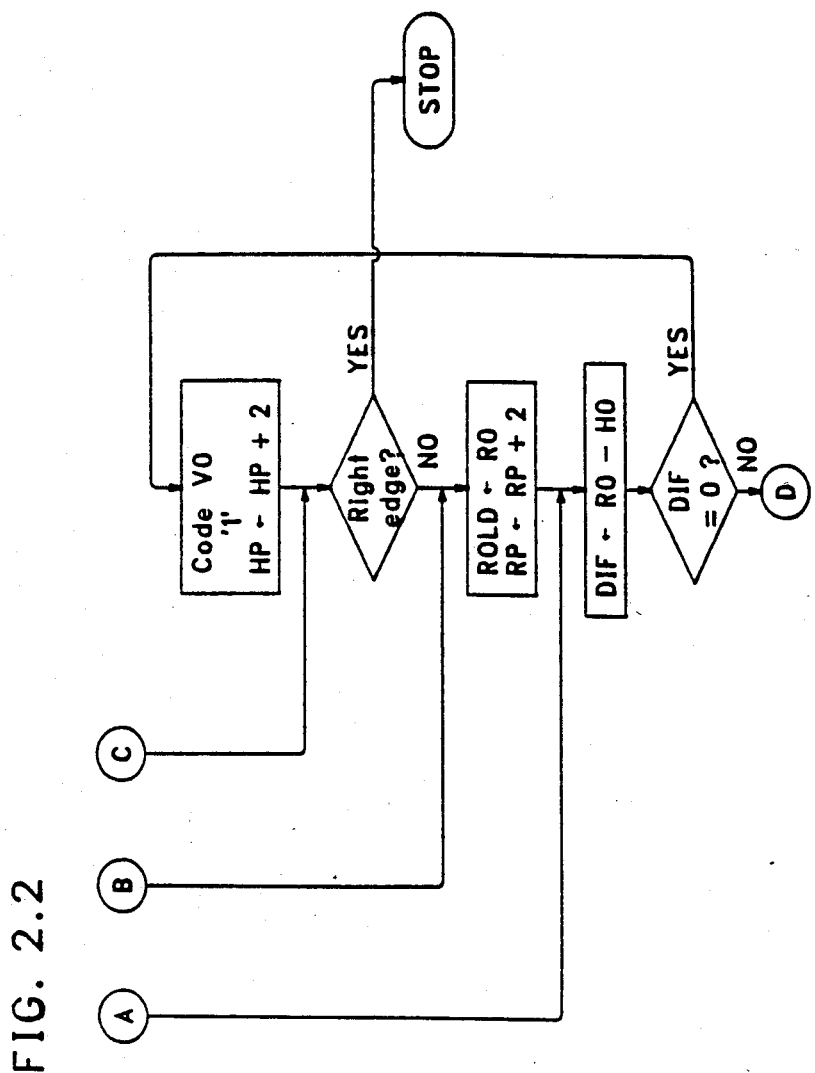
FIG. 2.2

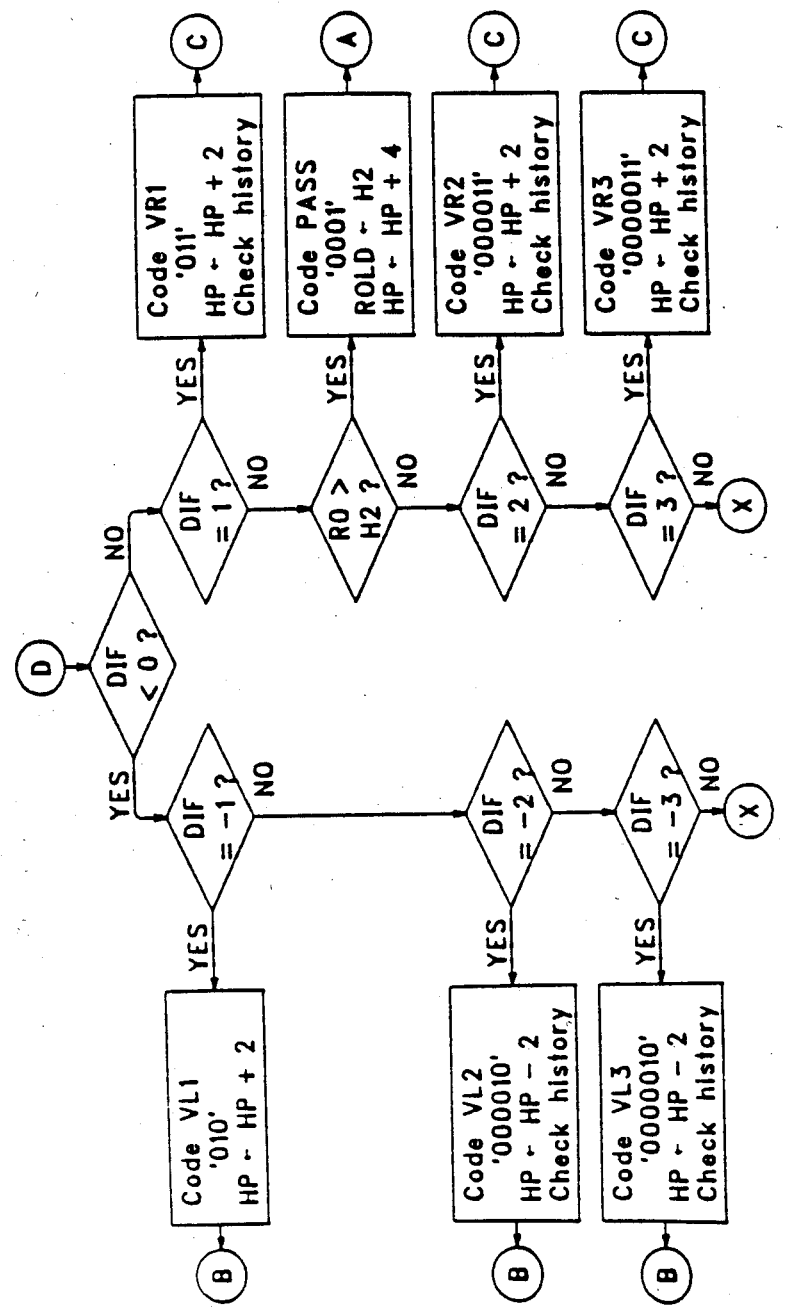
FIG. 2.3

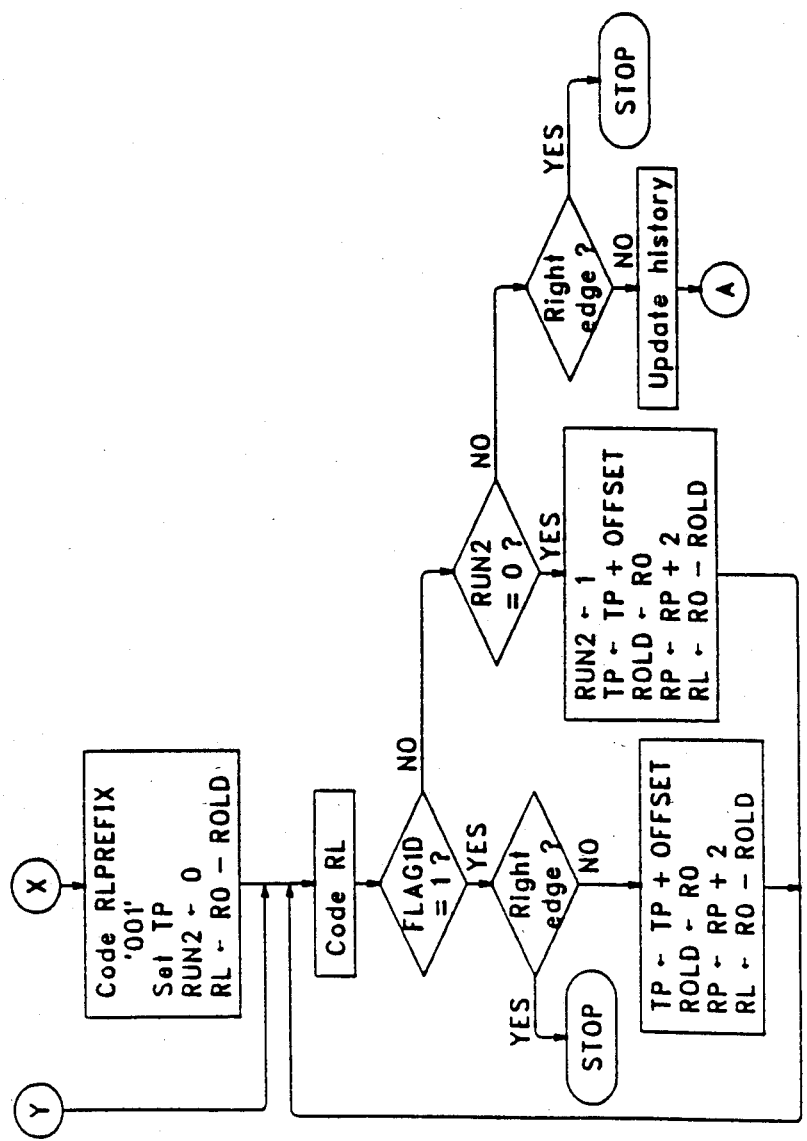
FIG. 2.4

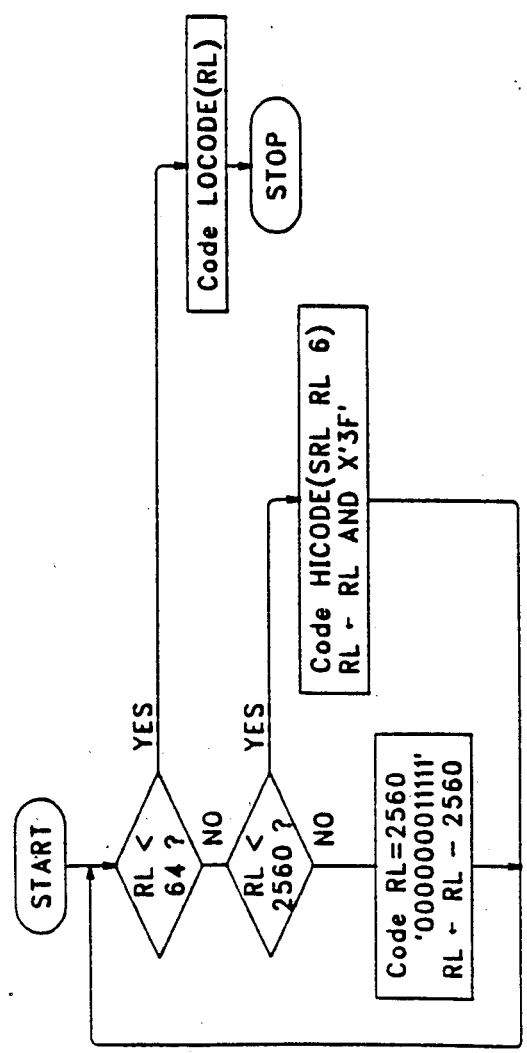
FIG. 2.5

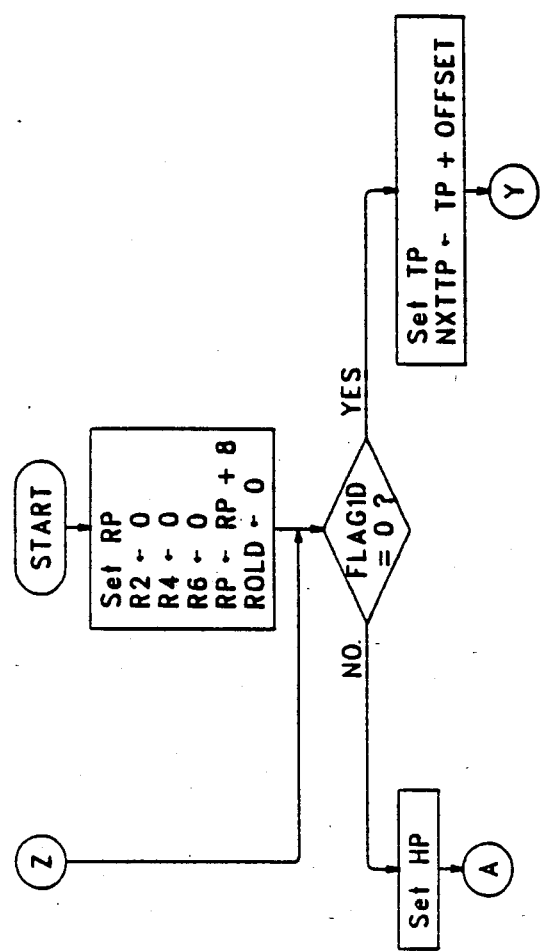
FIG.4.1

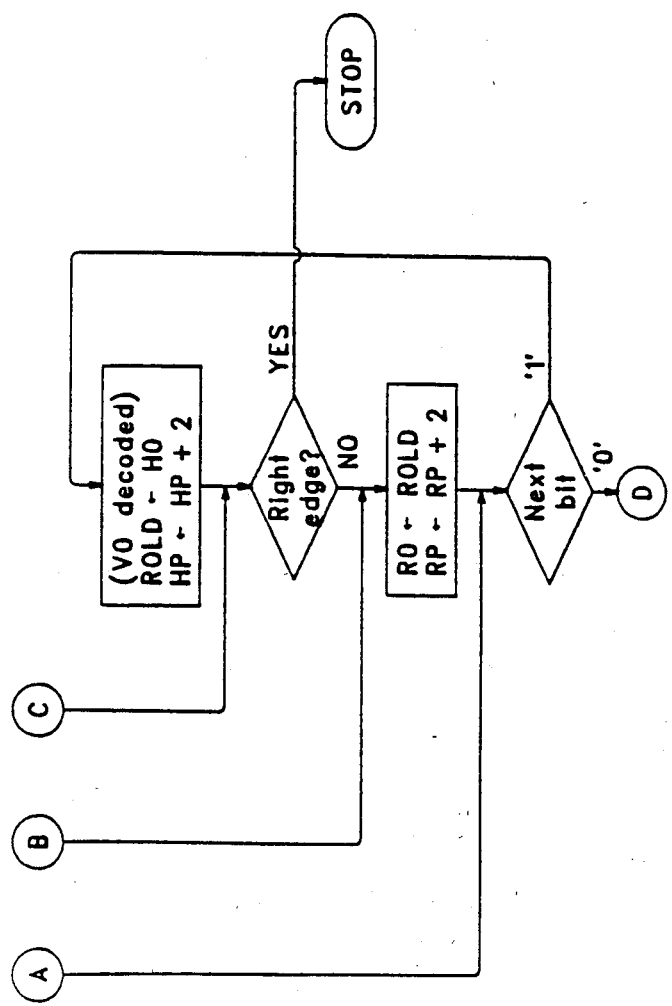
FIG. 4.2

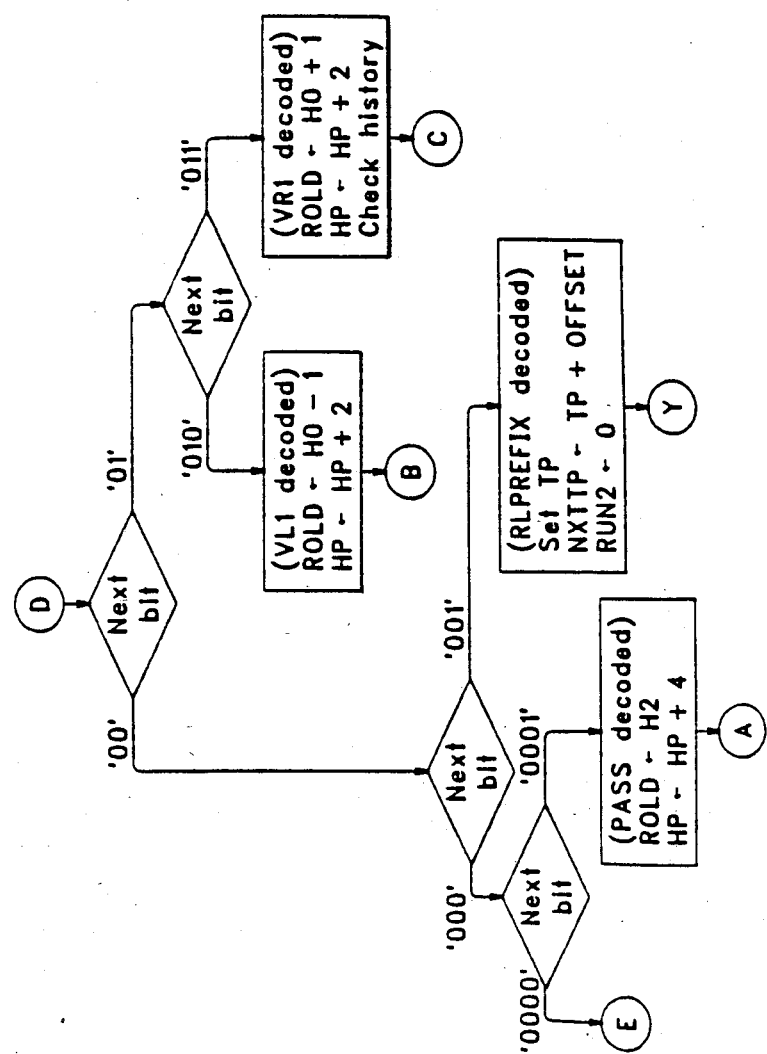
FIG. 4.3

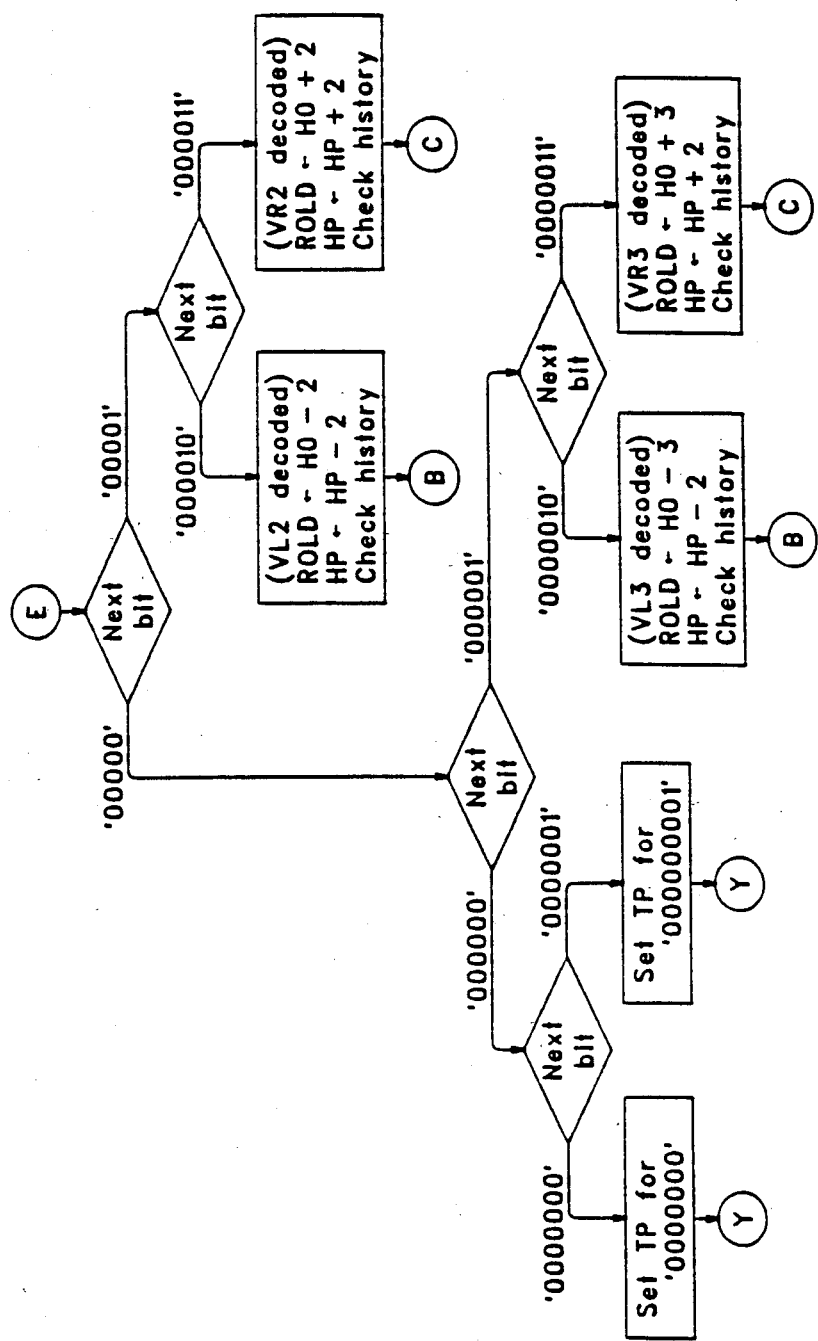
FIG.4.4

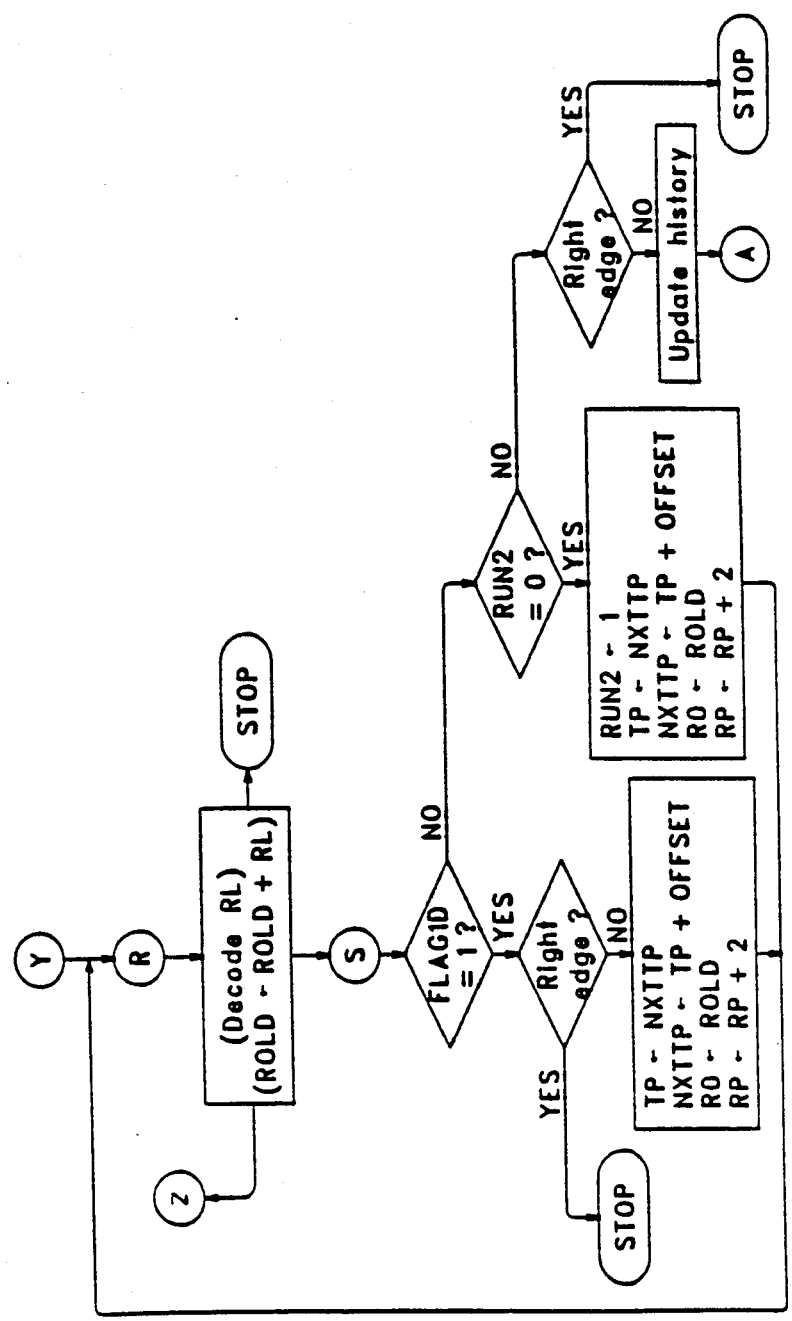
FIG.4.5

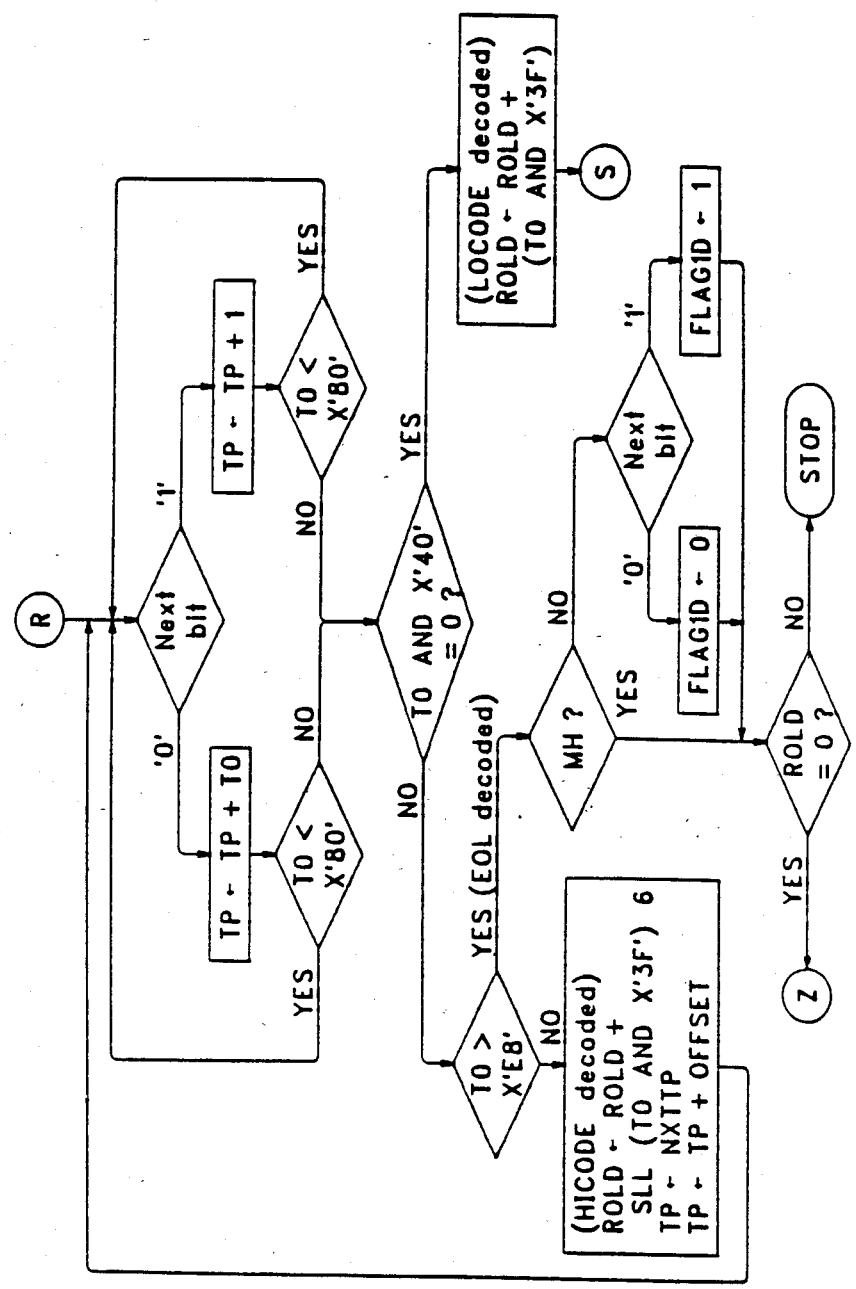
FIG.4.6

METHOD FOR ENCODING AND DECODING A DIGITAL IMAGE

RELATED APPLICATION

This is a divisional application of co-pending application Ser. No. 841,483, filed Mar. 19, 1986, now U.S. Pat. No. 4,728,318 which, in turn is a continuation-in-part application based upon our earlier co-pending application Ser. No. 571,239, filed Jan. 16, 1984, now abandoned.

BACKGROUND OF THE INVENTION

1. Field of the Invention

The present invention relates to digital image processing and more particularly to systems and methods for encoding and decoding electronic image data.

2. Description of the Prior Art

The following references disclose systems representative of the prior art in the field of electronic image processing.

R. Hunter and A. H. Robinson, "International digital facsimile coding standards", Proceedings of the IEEE, Vol 68, No 7, pp. 854-867, (Jul. 1980).

D. A. Huffman, "A method for the construction of minimum redundancy codes", Proc. IRE, vol. 40, pp. 1097-1101, (Sept. 1952).

A. J. Frank, "Uniform decoding of minimum-redundancy codes", U.S. Pat. No. 3,883,847, May 13, 1975.

H. Meyr, H. G. Rosdolsky, and T. S. Huang, "Optimum Run Length Codes", IEEE Trans. Comm. Vol COM-22, No 6, pp. 826-835 (Jun. 1974).

G. Goertzel and J. L. Mitchell, "Two-Dimensional Image Data Compression and Decompression System", U.S. Defensive Publication #T985,005, Aug. 7, 1979.

D. C. Van Voorhis, "Variable-length to fixed-length conversion of minimum-redundancy codes", U.S. Pat. No. 4,044,347, Aug. 23, 1977.

W. S. Michel, W. O. Fleckenstein and E. R. Kretzmer, "A Coded Facsimile System", IRE Wescon Conv. Rec. pp. 84-93 (1957).

Bahl, L. R., D. I. Barnea, and H. Kobayashi, "Image Compaction System", U.S. Pat. No. 3,833,900 (1974).

DELTA INFORMATION SYSTEMS, Inc., "Group 3 Facsimile Apparatus for Document Transmission", Appendix B, Final Report to National Communications System, Aug. 16, 1982.

With particular regard to the patented art:

U.S. Pat. No. 3,927,251 to White et al shows an apparatus and method for detection and control of errors in two dimensionally compressed image data;

U.S. Pat. Nos. 4,040,093 and 4,121,258 to Nakagome et al show methods for coding a facsimile signal employing two dimensional coding;

U.S. Pat. No. 4,103,287 to Frank shows a method for encoding an image signal employing image partitioning;

U.S. Pat. No. 3,927,251 shows a method for coding a facsimile signal employing detection and control of errors;

U.S. Pat. No. 3,830,965 to Beaudette shows a method for coding a facsimile signal employing one of two preselected encoding modes;

U.S. Pat. No. 4,028,731 to Arps et al shows a method for encoding an image signal employing cross array correlation; and U.S. Pat. No. 3,675,211 to Raviv shows a method for data compaction employing a three state associative memory.

It will be seen that Huffman describes in the Proc. IRE, Sept. 1952, article, a simple way to construct a minimum redundancy variable length code. The code word lengths are related to the frequencies of the source messages, the more frequent messages being assigned shorter code words. Such Huffman codes have been shown to be the optimum coding for an ensemble of messages. However, they have one major disadvantage over other (suboptimum) techniques for variable-length codes in that they are random patterns. This complicates the decoding process.

There is usually a tradeoff between speed of decoding and the size of the decode tables. Frank in U.S. Pat. No. 3,883,847 describes a table lookup for parallel decoding which is a compromise between speed and table storage. Meyr et al in IEEE Trans. Comm. Jun. 1974 looked for special classes which could be easily implemented by having the code words be multiples of fixed length blocks.

The CCITT one-dimensional (described in Hunter et al in Jul. 1980) run length standard uses a Modified Huffman code. The runs from 0-63 are individually coded while longer runs are constructed from codes for the multiples of 64 followed by a code for the remaining length of 0-63. Separate tables are used for the white and black runs since they have rather different distributions.

One way to implement a serial decode of the CCITT run lengths is by table lookup a bit at a time.

In Goertzel et al (T985,005) the least significant bit of the address into the ROM table is the next code bit. One of the output bits flags whether to continue decoding using the remaining output bits as the next table address or to stop because a complete code has been encountered. Then the output gives the run length size. The table could just as easily have the next code bit as the most significant bit. That case is equivalent to separate tables according to whether the next bit was a '0' or '1'.

CCITT ALGORITHMS

The International Telegraph and Telephone Consultative Committee (CCITT) has a standard one-dimensional data compression scheme (Modified Huffman) and an optional two-dimensional data compression scheme (Modified READ) for black-white facsimile images (see Hunter et al, above). Host-attached facsimile machines are available which can transfer compressed images to a computer. Methods for quickly decoding compressed images are needed on the host machine. Conversely, it is desirable to enable the host machine to encode image data and transfer it in compressed form to the facsimile unit. It is also useful to be able to extract parts of images (in either compressed or raster scan format) and recombine them, possibly with some padding, and either leave them in raster scan format for further processing on the host or encode them for transmission to the facsimile unit. The ability to decode and reencode without going to a raster scan format allows a compressed image to be conveniently converted from one compression algorithm to another.

The International Telegraph and Telephone Consultative Committee (CCITT) has standardized two facsimile data compression techniques. In Nov., 1977, CCITT Study Group XIV standardized a one-dimensional data compression scheme for facsimile images. Two years later this standard was incorporated in a two-dimensional coding scheme.

Data compression (coding) of images is essential if high quality digital facsimile is to be practical. A standard facsimile document has 3.85 scan lines/mm vertically. However, an optional vertical resolution of 7.7 lines/mm can be used for images with fine details. The standard horizontal resolution is fixed at 8.04 picture elements/mm (1728 picture elements in 215 mm) to avoid excessive "stair stepping" on curved or diagonal edges of the reproduced images.

Almost a quarter million bytes are required to store the raw digitized data of a 215 mm × 280 mm page at the normal resolution. At the higher resolution, close to a half million bytes are needed. Run length coding schemes, such as the CCITT one-dimensional standard, reduce the storage requirement by factors of 5 to 15 for typical images. Two-dimensional schemes take advantage of correlation between successive scan lines to obtain better compression.

Fixed codes assume that average statistics apply to all documents. However, some documents do not fit these statistics. When the assumptions are completely invalid, regions of the "compressed" image may require many more bits than the original uncompressed image. The uncompressed mode option in the two dimensional CCITT recommendation can be used to minimize the worst case local expansion.

The black and white picture elements in typical images are not randomly distributed but come with a high degree of correlation or redundancy. In each horizontal scan line the pels of a given color (black or white) tend to come in groups or runs. Run length coding takes advantage of this horizontal correlation in a practical way. The number of pels between color changes is coded instead of each pel. The runs alternate in color so that as long as the first run in a line is guaranteed to be a white run no extra bits are needed to specify the color. A length of zero can be used if the line actually starts black.

The CCITT one-dimensional standard Modified Huffman Code is a run length coding scheme in which the black and white runs have separate tables. Runs longer than 63 are coded in two pieces in order to decrease the size of the code tables by an order of magnitude. Multiples of 64 are coded first as a Makeup Code and then the remainder follows as a Terminating Code. Short runs (0-63) only need the Terminating Code.

Since the CCITT standard is for telephone transmission, the standard also includes a unique end of line (EOL) code for resynchronization after transmission errors. It is a unique pattern of eleven zeros followed by a one. Extra zeros can precede the EOL as fill bits to maintain a minimum transmission time per line.

Run length coding can only take advantage of the horizontal redundancy. There is also strong vertical correlation in most images which comes from the vertical continuity of objects, strokes, or lines. Vertical reference coding codes a run as the difference between the run length and the distance to the same color change on the history line (preceding scan line).

Generally about half of all the runs vertically align exactly and another 25% are within one pel of the appropriate transition. Larger vertical differences are much less frequent.

The CCITT two-dimensional Modified Relative Element Address Designate (Modified READ) coding scheme uses vertical reference codes out to plus or minus three. If a run does not end with a vertical reference code, the horizontal mode (HM) code precedes two Modified Huffman run length codes for that run and the next run. Coding a pair of runs with one prefix is a way of taking advantage of the high probability that a run length code is immediately followed by another run length code.

Sometimes a run on the preceding line comes from an object which terminated on that line. A pass mode skips over such runs on the preceding line as is shown by the following:

History line   1 1 1 0 0 0 1 1 0 0 0 0 0 1 1
Current line   1 0 0 0 0 0 0 0 0 0 0 0 0 1 1
               | ←—PASS mode—→| ←—V0—→| where V0 is the vertical reference zero, which means that a run on the current line ends at the same position as (i.e., with a zero offset from) the corresponding run end in the history line.

The coding of the PASS mode indicates that the vertical reference code which follows it refers to the end of the second white (0) run on the history line, rather than the first, as would normally be expected.

It is used if another transition is encountered to the right of the first vertical reference transition (before the end of the run). A new run is started at that transition. PASS mode can be coded several times within a single run.

In order to limit the effect of transmission errors, at least every Kth line is coded one-dimensionally. The value of K is set as 2 for the normal resolution and 4 for the higher resolution.

The Modified READ code table is given below.

| Modified READ Code Table | |
|---|---|
| RLPREFIX | 001 |
| PASS | 0001 |
| V0 | 1 |
| VL1 | 010 |
| VR1 | 011 |
| VL2 | 000010 |
| VR2 | 000011 |
| VL3 | 0000010 |
| VR3 | 0000011 |
| EOL | 000000000001T |
| Extensions | |
| 2-D | 0000001xxx |
| 1-D | 000000001xxx |

T on the EOL denotes a tag bit which tells whether the next line is coded one-dimensionally (T=1) or two-dimensionally (T=0). VL1 means "vertical reference left one", i.e., the current run ends one pel to the left of the history run; and the other V notations have related meanings, all in accordance with the CCITT Group 3 two-dimensional standard data compression algorithm.

One of the future extensions has been identified as uncompressed mode. The xxx bits are '111' for this mode. This mode can improve compression significantly for scanned halftones and images with many one or two pel runs.

| Uncompressed Mode Code Table | |
|---|---|
| Image Pattern | Code Word |
| 1 | 1 |
| 01 | 01 |

-continued

| | Uncompressed Mode Code Table | |
|---|---|---|
| | Image Pattern | Code Word |
| | 001 | 001 |
| | 0001 | 0001 |
| | 00001 | 00001 |
| | 00000 | 000001 |
| Exits | | |
| | — | 0000001T |
| | 0 | 00000001T |
| | 00 | 000000001T |
| | 000 | 0000000001T |
| | 0000 | 00000000001T |

The exit codes signal when to resume normal coding. The T denotes a tag bit which tells the color of the next run (Black=1, White=0).

The prior art discussed above neither teaches nor suggests the present invention as disclosed and claimed herein.

SUMMARY OF THE INVENTION

Therefore, it is an object of the present invention to encode and decode digital data by a method including the steps of: testing said data for a predetermined relationship between adjacent lines of said data; generating directly a reference code word representative of said predetermined relationship for each successful test; generating by table lookup a run code word for a stream of data bits of common value for each unsuccessful test, wherein a data element representing a number of bits in a code word is stored at a predetermined offset from a table entry representing said code word; merging said reference code words and said run code words generated by the above steps to form an encoded data stream; testing an encoded data stream for a reference code; decoding directly said predetermined relationship from said reference code for each successful test; decoding by table lookup a run of bits of common value by serial examination of said encoded data stream for each unsuccessful test; and storing data decoded by the above steps in a predetermined relationship.

Accordingly, a system for encoding and decoding digital image data includes means for accomplishing the steps of testing the data for a vertical relationship between adjacent lines of the image, generating directly a reference code word representative of the vertical relationship for each successful test, generating by table lookup a run code word for a stream of data bits of common value for each unsuccessful test, wherein a data element representing a number of bits in a code word is stored at a predetermined offset from a table entry for the code word, merging the vertical reference code words and the run code words generated by the above steps to form an encoded data stream, testing an encoded data stream for a reference code, decoding directly the vertical relationship from the reference code for each successful test; decoding by table lookup a run of bits of common value by serial examination of said encoded data stream for each unsuccessful test and storing data decoded by the above steps in a predetermined relationship.

The foregoing and other objects, features and advantages of the invention will be apparent from the more particular description of the preferred embodiments of the invention, as illustrated in the accompanying drawing.

BRIEF DESCRIPTION OF THE DRAWINGS

FIG. 2.1 is a flow diagram showing the initialization process for the encoding of one line of image data.

FIG. 2.2 is a flow diagram showing the inner loop for the line encoding procedure.

FIG. 2.3 is a flow diagram describing the generation of vertical reference codes.

FIG. 2.4 is a flow diagram describing the encoding of run lengths.

FIG. 2.5 is a flow diagram showing the process used to encode a single run length.

FIG. 4.1 is a flow diagram showing the initialization process for the decoding of one line of image data.

FIG. 4.2 is a flow diagram showing the inner loop for the line decoding procedure.

FIG. 4.3 is a flow diagram describing the decoding of some vertical reference codes.

FIG. 4.4 is a flow diagram describing the decoding of additional vertical reference codes.

FIG. 4.5 is a flow diagram describing the decoding of run lengths.

FIG. 4.6 is a flow diagram showing the process used to decode a single run length.

In the drawing, like elements are designated with similar references, and identical elements in different specific embodiments are designated by identical references.

DESCRIPTION OF PREFERRED EMBODIMENTS OF THE INVENTION

Figure 1:
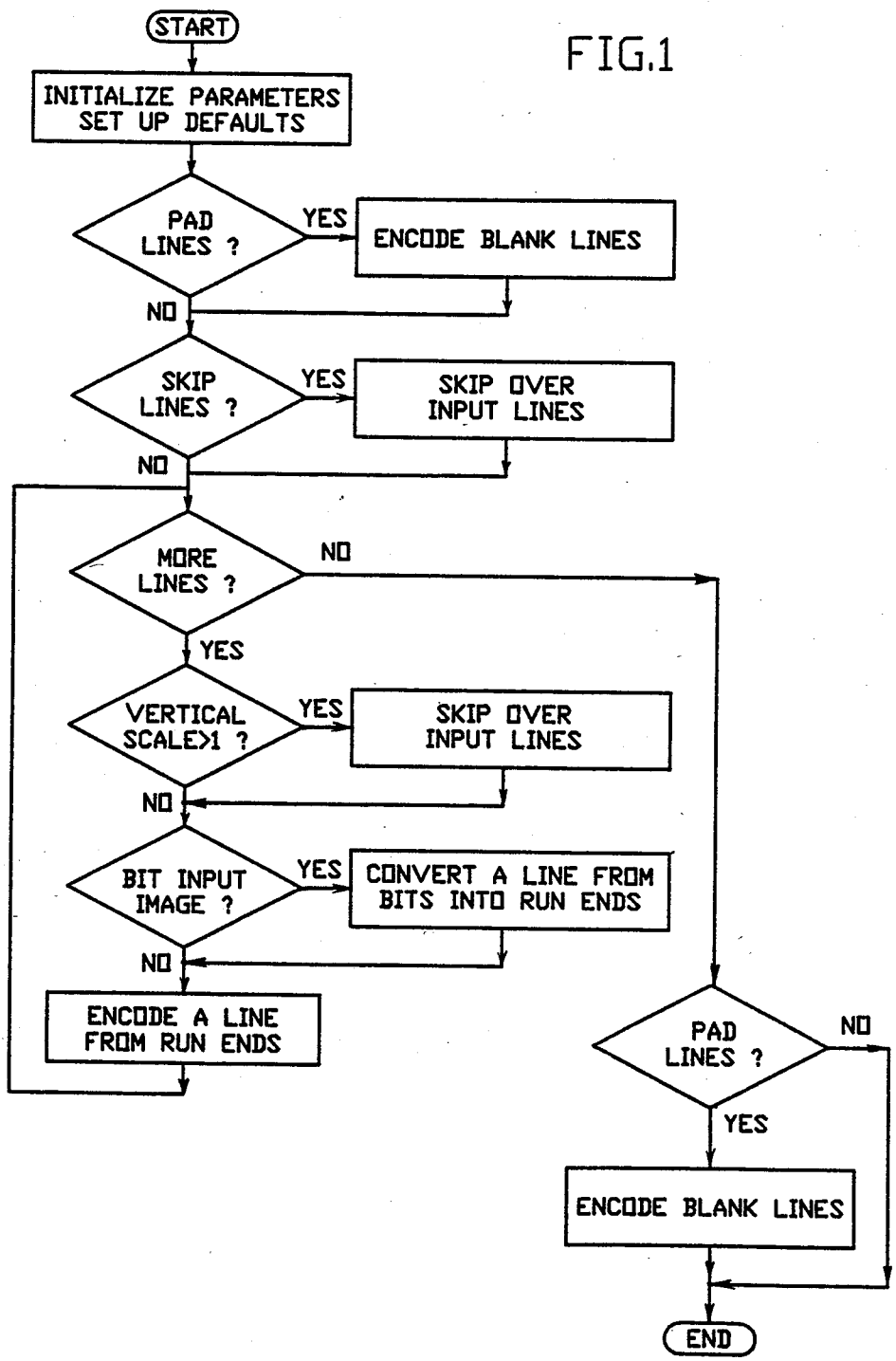
FIG. 1 is a flow diagram showing an overview of the encoding system according to the present invention.

The preferred embodiment will be described in the form of a computer program, but it will be understood by those skilled in the art that alternative embodiments including hardware implementations within the scope of the invention may be readily derived with the aid of the description presented.

The invention as described can encode and decode either the Modified READ or Modified Huffman CCITT standard algorithms, as well as variations of these algorithms which do not require end-of-line codes on every line.

The method of encoding a digital image in accordance with the present invention will be described first. The encoder works in two stages. First the input is converted from the input buffer into an end point buffer containing the color change positions (i.e. transitions or run ends). In the preferred embodiment of the invention, the first halfword in each end point buffer contains the number of bytes used. The next three halfwords are set to zero. The run ends are stored in subsequent halfwords, beginning with a white run end (which will be 0 if the first run in the line is black). The last run end (i.e. the line length) is replicated at least two extra times. Differences of adjacent halfword entries are the run lengths for the black and white runs.

The second stage of the encoding process codes each run either as a vertical reference code or as a run length. The vertical reference codes are generated with inline code. The run length code words are looked up in tables.

The run length code tables are set up as follows. The 8 least significant bits of the code words are stored right justified in a byte table. (Only the 8 least significant bits are non-zero if more than 8 bits are valid.) The number of valid bits is stored in another byte with a fixed offset from the code bits. During the encoding process, the compressed data is accumulated in a 32-bit register. Each time there are more than 16 valid bits in the register, the high-order 16 valid bits are output into a compressed data buffer. This guarantees that there is always room for the next code word, since no code word is longer than 13 bits. To add a code word to the compressed data, the current compressed data is shifted left by the number of valid bits (introducing zeros in the rightmost bits). Then the byte containing the right justified bits of the code word is ADDed/ORed into the 32-bit register. (The code word will only have non-zero bits where the zeros were introduced during the previous shift.)

After each line is encoded, an end point or run end buffer that describes it is saved to use as a history line for the next line. The program which calls the encoder can force it to ping-pong between two run end buffers, or alternatively it can cause the encoding of a sequence of run end buffers already in storage. In both cases, the previously encoded line must be saved for use as a history line in the two-dimensional encoding algorithm.

The variables referred to in the detailed description of the encoder are as follows:

FLAG1D - A flag which specifies whether the current line is to be encoded/decoded one-dimensionally (1) or two-dimensionally (0).

MH - A flag which indicates Modified Huffman encoding/decoding (1). In Modified Huffman coding no tag bit is expected after the EOL code.

RP - A pointer into the buffer of run end points. RP points at the (halfword) run end which is currently being processed. This run end is referred to as RO. Successive run ends are referred to as R2, R4, and R6.

RPST - A pointer to the starting address of the current buffer of run end points. This address will be saved as the address of the history buffer for two-dimensional processing of the next line before setting RPST to point to the next buffer of run end points.

HP - A pointer into the buffer of run end points for the history line. HP points at the (halfword) run end used as the history point for the run end currently being encoded. This history run end is referred to as HO. The following history run end is referred to as H2.

HPST - A pointer to the starting address of the buffer of run end points for the line preceding the line currently being encoded/decoded. This history buffer is used only for two-dimensional encoding/decoding. After each line is completed, RPST is saved in HPST.

RL - Run length size for run length coding.

ROLD - Position on the line which has already been encoded/decoded. During most of the coding ROLD contains the position of the previous run.

DIF - Number of pels between the edges on the history line (HO) and the current line (RO).

TP - The table pointer points at the top of the correct run length table during encoding of a run length. During decoding it points at the current table entry.

NXTTP - The next table pointer stores the start of the opposite color run length tables.

TO - Byte value referenced by TP.

OFFSET - The relative distance from the beginning of the run length tables pointed to by TP to the beginning of the run length tables for the opposite color. This value is stored along with the run length tables, based on TP. If the white run length tables are first in storage, then OFFSET is positive when TP points to the white tables and negative when TP points to the black tables.

HICODE - Code tables for the run length multiples of 64. The eight least significant bits of each code word are stored (the additional leading bits in the code word, if any, are zero), and the number of bits in each code word is stored at a fixed offset from the code word. This table is addressed using the pointer TP; there are separate tables for white and black run lengths.

LOCODE - Code tables for the run length from 0 to 63. The eight least significant bits of each code word are stored (the additional leading bits in the code word, if any, are zero), and the number of bits in each code word is stored at a fixed offset from the code word. This table is addressed using the pointer TP; there are separate tables for white and black run lengths.

BITIM - The flag which indicates that the next line of input for the encoder is already in the buffer pointed to by RPST as a list of change positions (run ends). Thus, the output of the decoder can be directly reencoded (with a different algorithm, set of options, or sub-section) without first creating the raster scan bit image.

ETOPPAD - The number of blank lines to pad in the compressed image before compressing input lines.

EBOTPAD - The number of blank lines to be compressed at the bottom of the image.

EYSKIP - Number of input lines to skip before starting encoding.

PADCLR - Blank lines and left and right padding can be either white (0) or black (1) according to the desired padding color.

EVSCALE - The vertical scale allows high (vertical) resolution facsimile image to be converted to a lower (vertical) resolution image by skipping lines during the encoding process.

LL - The line length is the number of pels per line to be compressed.

CNUM - The number of encoded bits in the register R which have not yet been stored in the compressed data buffer.

R - Register used to assemble the compressed bits.

RUN2 - A flag which indicates whether the first or second run of the required pair is being processed during two-dimensional run length encoding/decoding.

RLEN(BASE RPST) - The number of bytes used in the buffer starting at the address given by RPST is stored in the first two bytes of the buffer.

The compressed data is considered to be a continuous stream of bits. In the preferred embodiment of the encoding/decoding algorithms, however, this stream is divided into buffers (e.g. records of a compressed file on disk, or blocks of data to be sent over a transmission line). For computational convenience, the preferred embodiment of the algorithms divides the buffers into halfwords (two-byte units).

The encoder operation referred to as "coding" adds bits to the bit stream. In our implementation, the bit stream is managed as follows. The most recently coded 0–15 bits are kept in a 32-bit register R. A counter for CNUM gives the number of code bits in R at any given time. Bits are added to the code stream by shifting the contents of R left by the length (in bits) of the code to be added, adding or ORing the new bits into the low-order bits of R, and incrementing the counter for CNUM by the number of bits added. If after this is done there are more than 15 code bits in R, the high-order 16 code bits are transferred to the compressed data buffer in storage and the counter for the number of bits in R is reduced by 16. Since no code word in any of the encoding algorithms is more than 13 bits in length, this method guarantees that no data is shifted out of R before it has been stored.

In the preferred embodiment of the invention, the high-order 16 bits of code are transferred from R to the compressed data buffer by shifting R left by 32-CNUM bits (positioning the high-order bits beginning with the most significant bit in R), storing all 32 bits of R in the buffer, and then shifting R back 32-CNUM bits to the right. The low-order 16 bits stored are overwritten by the next storage operation. When storing the last half-word in the buffer, a copy is made of R, shifted right by CNUM-16, and the low-order half of the result is stored to avoid writing beyond the end of the buffer. A pointer keeps track of the next halfword in the buffer to be written; when the end of the buffer has been reached, it is sent out (written to disk, sent over the transmission line, etc.) and a new buffer (possibly the same one) is obtained into which to write additional halfwords of compressed data.

Referring to FIG. 1, the method of encoding image data according to the present invention will now be described.

INITIALIZATION FOR ENCODING METHOD

The initialization process for encoding described below occurs only once for each image encoded.

Artificial all white and all black lines are created.

A run end point buffer representing a white blank line is created and stored. It has the following sequence:

16 0 0 0 LL LL LL LL where LL is the line length.

A run end point buffer representing a black blank line is also created and stored. It has the following sequence:

16 0 0 0 0 LL LL LL

These buffers will be used as blank line end points to be encoded when ETOPPAD and EBOTPAD are non-zero.

HPST is initialized to point at the first white run (first LL) of the blank white line run buffer, in case the first line of the image is to be encoded two-dimensionally and the convention is adopted of a blank white history line.

CNUM is initialized to 0. Other initialization for managing the compressed data should be done at this time.

Other variables such as MH, FLAG1D, BITIM, and VSCALE are operator controlled to select the desired options. Both the one-dimensional and two-dimensional CCITT standards require that the first line be encoded one-dimensionally; therefore, if the CCITT standard is selected, FLAG1D must be set to 1 initially.

PAD LINES

If ETOPPAD is positive, then extra blank lines should be encoded at the top of the image. First RPST must be set to either the black or white blank line according to PADCLR. Then the subroutine to encode a line from run ends must be called once for each extra line.

SKIP LINES

If EYSKIP is positive, then the appropriate number of input image lines must be skipped.

LOOP TO ENCODE ONE LINE

The main encoder loop encodes one line. It first tests to see whether there are any additional lines to be encoded; if not, an exit from the loop occurs. The test for additional lines can be done in many ways. One way is to preset the number of input lines desired, decrement a counter for each input line processed, and stop processing input lines when the counter reaches zero.

The vertical scale parameter EVSCALE, if greater than one, allows input lines to be skipped and therefore for a lower resolution to be encoded than the original image. Here the lines are shown as being skipped first, but this is not essential.

The input image would frequently be a raster scan image. If so, then a line must be converted into a run end representation. A preferred method for converting from a bit map representation to run representation is given in U.S. Pat. No. 4,610,027, of Anderson et al, assigned to the same assignee as the present application. Alternately, the input image might be in the form of many lines already in run end point format. One such source would be the decoder. This makes conversion between the one and two-dimensional algorithms and the various options easier since the conversion to and from the raster image can be avoided.

The input image is encoded a line at a time from the run ends. This process will be described in greater detail with reference to FIGS. 2.1 to 2.5.

Once the desired number of input lines have been processed, extra lines are padded if EBOTPAD is positive. The same process of pointing to the desired color blank line used with ETOPPAD is used at the end of the image. EBOTPAD may be calculated at this point to maintain a fixed size image.

After all of the lines have been processed and before exiting completely, the Return to Control sequence of 6 EOLs may be coded.

PROCEDURE TO ENCODE ONE LINE

FIGS. 2.1 through 2.5 illustrate the steps required to encode one line from a run end point representation.

FIG. 2.1 shows the initialization required before encoding the data. Some selection criteria are used to determine whether the next line is to be encoded one-or two-dimensionally. For the two-dimensional standard, a one-dimensional line must be encoded at least once every K lines, where K is a constant (2 or 4 for the CCITT standard).

For the one-dimensional case, an end-of-line code is first coded; the bit pattern is '000000000001' if the Modified Huffman algorithm is being used and '000000000011' otherwise. RP is set to point to the first run end to be encoded; TP is set to point to the run length code tables for white runs; RL (the length of the next run to be encoded) takes the value of the first run end of the line; and FLAG1D is set to 1, indicating that the current line is being encoded one-dimensionally. Control then passes to the loop which encodes runs using the run length coding procedure.

If the line is to be encoded using the two-dimensional algorithm, the end-of-line (EOL) code is optional; a flag is tested to determine whether it should be coded. In an error-free environment it may be desirable to omit the EOL code. However, under many circumstances (when encoding using the CCITT standards, when switching from one-dimensional to two-dimensional encoding, or when a minimum number of bits per compressed line must be maintained), the EOL code will precede a two-dimensionally encoded line. If the EOL is coded, the bit pattern is '0000000000010'. RP is set to point to the first run end to be encoded; HP is set to point to the first run end in the run end buffer describing the history line; ROLD (the run end of the last run encoded) is set to 0; and FLAG1D is set to 0, indicating that the current line is being encoded two-dimensionally. Control then passes to the loop which encodes runs using either vertical reference codes or run length coding.

FIG. 2.2 shows the inner loop for the two-dimensional scheme. This loop calculates the difference (DIF) between the run end being encoded and a given run end in the history buffer. If this difference is zero, a vertical reference 0 (binary code '1' for V0) is encoded and the history buffer pointer HP is incremented to point to the next run end in the history line. At this point the history run end pointed to by HP (which will be used to encode the next run) is guaranteed to be to the right of the end of the run just encoded. A test is performed to determine whether the run end just encoded was at the right edge of the line being encoded; if so, the entire line has been encoded and an exit from the line encoding procedure occurs. Otherwise, the run end just encoded is saved as ROLD, the run end pointer RP is updated to point to the next run to be encoded, and the process repeats.

The main loop is reentered in three places. The loop is entered at point A immediately after initialization, after a pair of runs has been run-length coded in the two-dimensional algorithm, or after the PASS mode has been coded. The other entry points are used after a nonzero vertical reference has been coded. In those cases the run end pointer RP still points to the last run encoded; it must be updated before calculating DIF. If the coded run ended to the right of the history run, the loop is entered at point C, before the test to see if the right edge has been reached. If the coded run ended to the left of the history run, then clearly the right edge has not been reached (since the line to be encoded has the same length as the history line), so the test for the right edge can be skipped and the loop reentered at B.

When the right edge of the image is reached, immediately before control is returned to the main loop in the encoder (described in FIG. 1), the pointer to the beginning of the run end buffer for the line just encoded (RPST) is copied to HPST so that the line will be available for use as a history line if the next line is to be encoded two-dimensionally. All other exits from the loop to encode a line also update HPST.

If the value of DIF calculated in the main loop is nonzero, then tests are performed to see whether another vertical reference or a PASS code can be generated. This procedure is described in FIG. 2.3.

If DIF is less than zero (i.e. the current run end is to the left of the history run end), then we test to see if a vertical left reference is to be coded. If the current run ends one pel to the left of the history run, we code a vertical left reference 1 (bit patterns '010' for VL1) and increment the history pointer HP to point to the next run in the history line, since that must be the first history run end of the opposite color which is to the right of the run end just encoded. The existence of extra copies of the last run end (line length) in each line guarantees that there will be usable history data at HP even if the right edge has been reached. Control then returns to the main loop.

If the current run ends two or three pels to the left of the history run, we code a vertical left reference 2 or 3 (bit patterns '000010' and '0000010' for VL2 and VL3, respectively). The history pointer HP is backed up, in case the previous history run ended to the right of the end of the run just encoded. A test is performed to see if this is in fact the case; if not, the history pointer is incremented to point to the next run of the same color. Control returns to the main loop. If no vertical reference code can be generated, the run length portion of the code is entered to encode a pair of runs.

If DIF is greater than zero, we may be able to code the run as a vertical right reference or a PASS. If the current run ends one pel to the right of the history run, we code a vertical right reference 1 ('011' for VR1), and increment the history pointer to point to the next history run. This history run end is not to the left of the end of the run just encoded. A test must be made to ensure that it is in fact to the right of that run end. If it is not, then HP is incremented again. Control then returns to the main loop.

If a VR1 is not coded, we determine whether the current run end is to the right of H2, the next run (of the opposite color) in the history buffer. If it is, then we code a PASS ('0001'), store the end point H2 as ROLD, point the history pointer to the run end of the next history run of the same color as the run being encoded, and return control to the main loop.

If neither a VR1 nor a PASS can be coded, we determine if the current run ends 2 or 3 pels to the right of the history run. If so, we code the appropriate vertical right reference ('000011' or '0000011' for VR2 or VR3), and increment the history pointer to point to the next history run. A test must be made to ensure that it is to the right of the run end just encoded. If it is not, then HP is incremented again and the new H0 is tested. If it is still not to the right of the end of the run just encoded, HP is incremented again. Control then returns to the main loop.

If a vertical reference cannot be coded, the run length coding portion of the algorithm is used to encode a pair of run lengths.

FIG. 2.4 shows the procedure used to encode run lengths. This procedure may be entered from one of two places: either immediately after the initializations for one-dimensional encoding of a line (point Y), or from the portion of the two-dimensional algorithm which attempts vertical reference coding, if such coding is not appropriate (point X).

If the run length encoder is entered from the two-dimensional algorithm, some initialization is required. A prefix indicating that a pair of runs is encoded using the run length algorithm (binary code '001' for the RL prefix) is coded. TP must then be set to point to the run length tables for the color of run which is to be encoded first. This color may be determined by taking the difference of RP and RPST and determining whether or not it is a multiple of four. Since there are four entries in the run end buffer before the run end data begins, and since each entry requires two bytes, the white run ends are stored at offsets of 8, 12, 16, . . . in the run end buffer while the black run ends are stored at offsets 10, 14, 18, . . . . Thus, if RP-RPST is a multiple of four, TP is set to point to the white tables; otherwise TP is set to point to the black tables. After TP is set, a flag (RUN2) is set to 0 to indicate that the first run of the pair is being encoded, and the run length of the run to be encoded is calculated as the difference between the current run end and the value saved as ROLD (which is either the end of the previous run or the position coded using PASS mode).

After the initialization (if any) has been performed, a run length is encoded. This process will be described in greater detail with reference to FIG. 2.5. After the run length has been encoded, some updating must be done and a decision must be made as to whether to encode another run length.

FLAG1D is first tested to determine whether the current line is being encoded one-dimensionally. If it is, then the run end of the last run encoded is tested to determine whether the right edge of the image line has been reached; if it has, then the entire line has been encoded, and exit from the line encoder occurs. Otherwise, the table pointer TP is set to point to the run length tables for the opposite color (the color of the next run to be encoded), the run end just coded is saved, the run end pointer is incremented to point to the run end of the next run to be encoded, and the run length to be encoded is calculated as the difference between the old and new run ends. Control then goes to the top of the loop to encode the new run length.

If the current line is being encoded two-dimensionally, the flag RUN2 is tested to determine if the run just coded was the first or second run of a pair. If it was the first, then another run must be encoded using run lengths. RUN2 is set to one to indicate that the second run of the pair is being encoded, and then the same setup procedure used for one-dimensional coding is performed: TP is set to point to the run length tables for the opposite color, the run end just coded is saved, the run end pointer HP is incremented to point to the run end of the next run to be encoded, and the run length to be encoded is calculated as the difference between the old and new run ends. Control then goes to the top of the loop to encode the new run length.

If the current line is being encoded two-dimensionally and the last run coded was the second run of a pair, then R0 is tested to determine if the right edge of the line has been reached. If it has, an exit from the line encoder occurs. Otherwise the history pointer HP must be updated. Since it already points to a run of the correct color, updating consists of testing to see if the history run end pointed to by HP is to the right of the end of the run just encoded. If it is not, then HP is incremented to point to the next history run end of the same color, and that run end is tested. This process repeats until a history run end which is to the right of the end of the run just encoded is found. We are guaranteed that such a history run end exists since the run just encoded ends to the left of the right edge and we must eventually encounter a history run end which is on the right edge. Control then returns to the main loop for two-dimensional encoding.

FIG. 2.5 shows the procedure for encoding a run length. A run length is encoded using zero or more "makeup" codes (encoding multiples of 64 which are no greater than 2560) and one "terminating" code giving the number of leftover bits (0–63). The run length is the sum of the values corresponding to the code words. Thus a run length of 5150 would be encoded as 2560+2560+30; a run length of 4000 would be encoded as 2560+1408+32; a run length of 2000 would be encoded as 1984+16; and a run length of 10 would be encoded using only the terminating code for 10.

The loop which encodes a run length first tests the run length to see if it is less than 64. If it is, then the appropriate terminating code LOCODE(RL) can be coded, and encoding of the run length is complete. Otherwise, the run length is tested to see if it is greater than or equal to 2560. If so, then the makeup code for 2560 ('000000011111') is coded, the run length to be encoded is decremented by 2560, and control goes to the top of the loop. If the run length is not greater than 2560, then it is divided by 64 (this operation is implemented as a right shift) to obtain a value which is used to index into the table (HICODE) of makeup codes. The appropriate makeup code is coded, and the remainder from the division replaces the previous value of RL. This is accomplished by masking out the portion of RL which was used to generate the index for the makeup code. Control then returns to the top of the loop to encode the remainder.

DECODING METHOD

A method of decoding an encoded compressed digital image in accordance with the present invention will be described next with reference to FIGS. 3 through 4.6. The following list sets forth some of the features of the present invention which allow fast decoding.

1. Simple tables are used for fast serial decoding of Huffman variable length code words. The intermediate nodes specify the relative distance to the next node for a 0 (or 1) bit next in the compressed data stream. The other color sense has its next node as the next entry in a table. Negative entries flag terminating nodes and contain information about the code word found. For the Modified Huffman tables if branching is done for a '0', the relative distance to the next node in the table is never more than 78, so a byte table is adequate even though 221 entries are used.

2. The same register is used to sequentially look at the compressed bits and to keep track of when all bits have been examined. The test for whether more data is needed is only necessary if a '1' compressed bit was apparently found since this might be the marker bit which flags the end of the data. Only in that special case will the rest of the register be zero.

3. The vertical reference codes are decoded with in-line code so that the location in the program indicates the code word found. Minimum tests are made to update the pointers into the history data buffers. The run end buffer is constructed so that even on the left and right edges looking forward or backwards up to three runs will still give correct information.

4. Fast code is used to create a bit map from the positions of color changes as described in U.S. Pat. No. 4,596,039 of J. L. Mitchell et al, assigned to the same assignee as the present application.

5. One subroutine is used to decode all three algorithms with almost no extra overhead. This minimizes the object code size.

6. Most of the variables needed in the inner loop can be kept in registers.

DECODER OVERVIEW

The basic process to decode an image line is done in two steps.

First, each line is decompressed into a buffer of run end positions in a subroutine. The run end buffer is saved at least until after the next line is decoded because it is needed to supply the history line for two-dimensional decoding. The run end buffer has the same format as the run end buffer for the encoder. As a consequence of this structure, even on the left and right image edges looking forward or backwards up to three runs will still give correct information. This is accomplished by replicating the first and last runs at least two more times. The advantage of at least three copies of the final run end value is that one can always move the pointer two runs ahead and still have valid data. Many less tests are thus needed during the decoding process.

The compressed data stream can be correctly interpreted by decoding only into run ends. Thus, if some lines are to be skipped at the top of the image, these can be removed by only decoding into the run ends until the requisite number of lines have been ignored.

Second, if a bit image is desired, then the run end positions are converted to a bit map by a method described in previously-noted U.S. Pat. No. 4,596,039.

One subroutine is used to decode all three algorithms into the buffer of run ends with almost no extra overhead. This minimizes the object code size. All three algorithms start with an EOL followed by a one-dimensional line. Therefore, the decoder must be able to decode one-dimensional lines. These lines occur at least every 2 to 4 lines for the MR algorithm. During two-dimensional coding the Horizontal Mode prefix code of '001' is followed by a pair of runs which must be decoded with the one-dimensional algorithm. A few simple switches are set so that tests against zero will keep the one-dimensionally coded lines always inside the run length decoding loop.

One main difference between the prior art MR code and the present MMR code is the fact that the MR code has an EOL on every line. An EOL consists of at least eleven zeros followed by a 1 followed, for two-dimensional decoding, by a tag bit which specifies whether the next line is one- or two-dimensionally coded. It is needed at the end of each line in order to stop error propagation in Group III machines. By checking for the right edge of the compressed image after each run, the EOLs are not needed to flag the end of a line. The same code can be used for both algorithms by restarting the loop to decode a line if an EOL is found first. A flag is set so if a second EOL is decoded next, the RTC sequence is recognized.

DECODE TABLES FOR HUFFMAN VARIABLE LENGTH CODES.

Simple tables for serial decoding of Huffman variable length code words are easily constructed and fast to decode. For N code words, N-1 entries are intermediate nodes which specify the relative distance to the next node for either the 0 or 1 compressed bit. The other color sense does not need an explicit entry because its next node is the next entry in the table. N entries are terminating nodes. These are distinguished from intermediate nodes by a flag bit (in this embodiment the most significant bit). The remainder of the terminal node entry is the information about the code word. The entry at intermediate nodes can also be the absolute index into the table.

For the Modified Huffman tables if branching is done for a '0', the relative distance to the next node in the table is never more than 78, so a byte table is adequate even though 221 entries are used. (It is ideal for 8 bit microprocessors.)

| Table of byte patterns | |
|---|---|
| Intermediate Nodes | |
| 0XXXXXXX | Add 0XXXXXXX to current pointer to get to next entry if '0' next. Add 1 to get to next entry if '1' next. |
| Terminal Nodes | |
| 10XXXXXX | Run lengths 0-63. |
| 11XXXXXX | if XXXXXX < 41 then it is the high order 6 bits for the run lengths which are larger than 63. |
| 11111100 | Uncompressed mode |
| 11111101 | Illegal bit patterns |
| 11111110 | 10 zeros followed by a 1 (maybe EOL) |
| 11111111 | 11 zeros of EOL |

The entry for 11 zeros (221st entry in the table) is made an intermediate node with a relative distance to the next node of 0. Then any zeros following the 11 zeros will not cause a movement to a new entry. The EOL terminal node of x'FF' is moved to the 222nd byte. The first '1' following the indefinite string of more than 10 zeros will be identified as the EOL.

A method to generate these decode tables is given next.

1. List all code words with a field containing the information needed for these terminal nodes.
2. List all prefixes to these codes including the null code and indicate that they are intermediate nodes.
3. Sort as an ascending binary sequence and remove duplicates.
4. To generate the intermediate node table entries append the bit which will be used to branch and find the match to the longer bit pattern. Fill in the relative distance in the desired units.

In the simple example below the intermediate nodes are flagged with an I and the terminal nodes with a T.

| Original Code Words | Node Info. | |
|---|---|---|
| 0 | T | 1 |
| 10 | T | 2 |
| 111 | T | 3 |
| 1100 | T | 4 |
| 1101 | T | 5 |

Table in ascending order of codes and prefixes for branching on 1.

| Code | | |
|---|---|---|
| . | I 2 | |
| 0 | T | 1 |
| 1 | I 2 | |
| 10 | T | 2 |
| 11 | I 4 | |
| 110 | I 2 | |
| 1100 | T | 4 |
| 1101 | T | 5 |
| 111 | T | 3 |

If the I/T bit were converted into the most significant bit of a byte, then the final table would be 2 129 2 130 4 2 132 133 131.

Each byte either indicates the relative distance to go if the next bit decoded is a '1' or gives the result of the decoding. The most significant bit (MSB) steers the decoding process. If the MSB is zero, then continue decoding by skipping to the next byte if the next compressed bit is a '0' or skipping the number of bytes specified in the byte table entry if a '1' is next. The flag for complete decoding is the MSB set to a 1.

The process of decoding an image into storage is now described. In addition to the variables defined for the encoding process, the decoder uses the following variables:

DTOPPAD-The number of blank lines to pad at the top of the output image before decoding input lines.

DBOTPAD-The number of blank lines to pad in the output image after finishing decoding. DBOTPAD can be used to create a fixed size output image.

DYSKIP-Number of input (compressed) lines to skip before outputting lines into the output buffer.

DVSCALE-The vertical scale allows low (vertical) resolution facsimile image to be converted to a higher (vertical) resolution image by duplication of lines during the decoding process.

In the decoder, the basic operation performed on the compressed data stream is a test to determine whether the next bit is a zero or a one. In the preferred embodiment the compressed data stream in the decoder is managed by keeping 0–16 bits of compressed data left-justified in the 32-bit register R. The bit immediately beyond the end of the compressed data is a 1; all remaining bits in R are zero. We can then test the next compressed bit (the high-order bit in R) by the following procedure. R is added to itself. This shifts all bits of R left one bit.

In the IBM 370 series the ADD sets condition codes which specify whether a carry/overflow occurred from the high-order bit of R (the bit to be tested) and whether the remainder is zero. If no carry occurs, the bit tested was a zero, and this information can be returned to the decoder. If an overflow did occur, then either a one bit occurred in the compressed data stream or the one bit which flags the end of the compressed data has been shifted out. Which of these is the case can be determined by examining R. If R is nonzero, then the flag bit is still in R, and consequently the one which was shifted out was a bit of compressed data, so this information can be returned to the decoder. If R is zero, then the one which was shifted out was the flag bit. In this case we must read in another byte or halfword of compressed data, left-justify it in R (introducing zero bits in the low-order portion or R), and insert a flag bit immediately beyond the end of the new data. The next bit can be tested, and the result returned to the decoder. A counter keeps track of the next halfword of compressed data to be used; when the buffer is exhausted, more data is requested from the operating environment.

For machines other than the IBM 370 series, the most significant bit can be tested by determining whether the register is negative and then adding it to itself. Only on the negative path will it be necessary to test if the register is now 0 and therefore the last bit was the flag bit.

When decoding the Modified Huffman run lengths, if 16 new (not all zero) compressed bits are loaded into the compressed data register then testing for the end of valid data will not be needed for the rest of that code word. The longest code is 13 bits, except for the extra zeros added by FILL to the EOL. Thus as long as the new bits are not all zero, the code is guaranteed to end before the marker bit is reached.

In addition, when decoding the vertical reference codes, once new data has been moved into the register, there are guaranteed to be 8 valid bits, which is the maximum number needed to decode any of the vertical reference codes as well as the first 8 zeros for the EOL. In this case a separate path which does not check for valid data could be followed.

Figure 3:
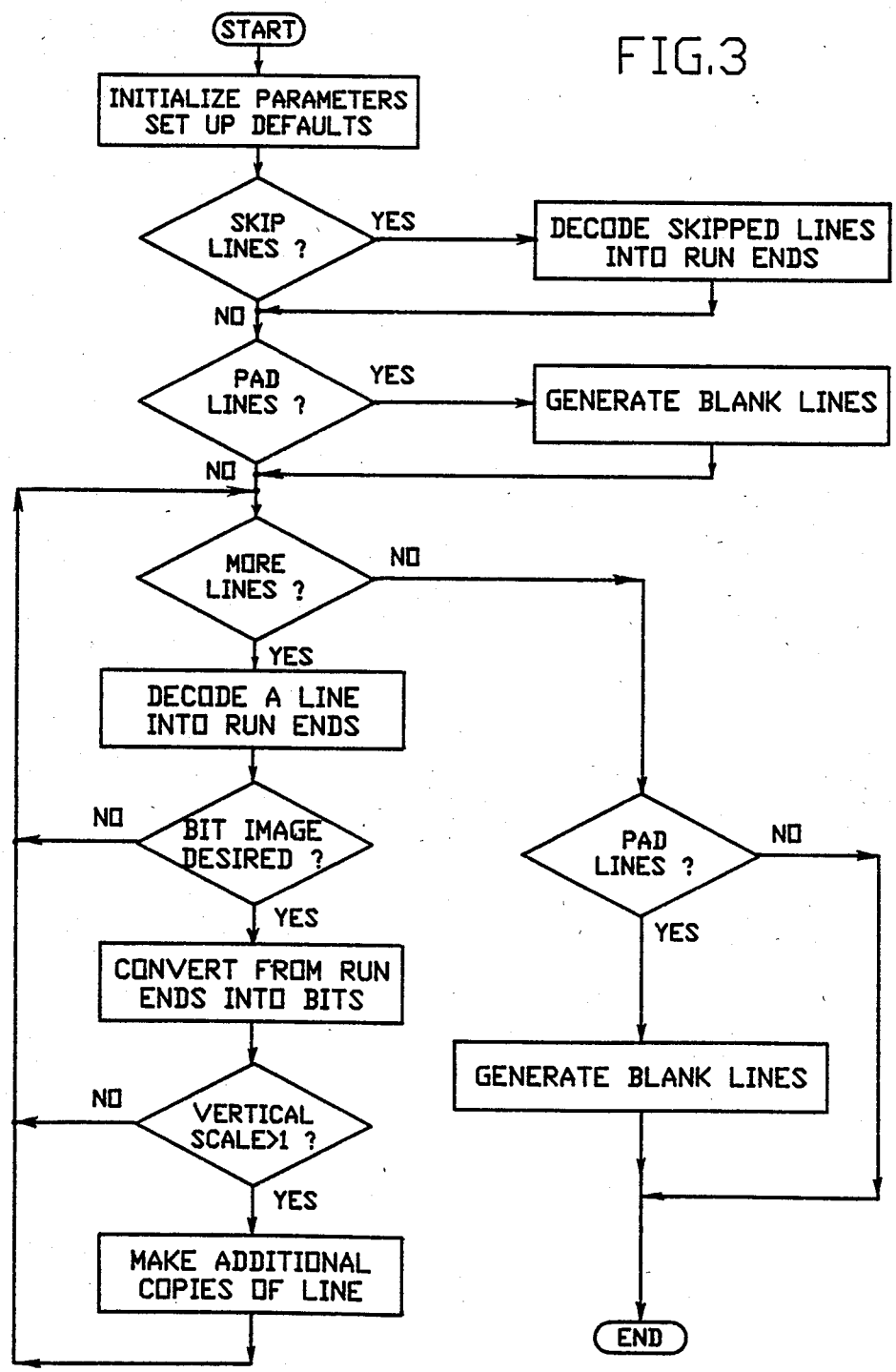
FIG. 3 is a flow diagram showing an overview of the decoding system according to the present invention.

Referring to FIG. 3, the method of decoding compressed image data according to the present invention will be described.

INITIALIZATION FOR DECODING METHOD

The initialization process for decoding is described below. It also occurs only once for each image decoded and is similar to the initialization required for the encoder.

Artificial all white and all black lines are created. If the actual line length is not known, then LL is set to X'FFFF' and the blank lines are recalculated after the first one-dimensional line has been decoded to determine the real line length.

A run end point buffer representing a white blank line is created and stored. It has the following sequence:

16000LLLLLLLL where LL is the line length.

A run end point buffer representing a black blank line is also created and stored. It has the following sequence:

160000LLLLLL

These buffers will be used as blank line end points to be decoded when DTOPPAD and DBOTPAD are non-zero.

HPST is initialized to point at the first white run (first LL) of the blank white line run buffer, in case the first line of the image is to be decoded two-dimensionally and the convention is adopted of a blank white history line.

The register used to examine the compressed data a bit at a time is initialized to X'80000000'. This will cause compressed data to be read the first time that an attempt is made to test a bit.

Other variables such as MH, BITIM, and VSCALE are operator controlled to select the desired options. FLAG1D will normally be set by the leading EOL in the compressed data. It must be preset if there is none.

SKIP LINES

If DYSKIP is positive, then the appropriate number of compressed lines must be decoded into run ends and discarded.

PAD LINES

If DTOPPAD is positive, then extra blank lines must be generated at the top of the image. Since the first line is always decoded one-dimensionally and followed by an End of Line (EOL) code, the number of bits per line are known at the end of the first decoded line. If no lines are skipped, and extra lines should be padded, then the size of the output image must be preset. (This can be done by decoding just one line to find the original line size and then restarting the process).

To generate blank lines, RPST is set to either the black or white blank line according to PADCLR. If a run end representation of the image is desired, then the 16 bytes are copied the correct number of times into the output buffer. Otherwise, the procedure to convert from run ends to bits is applied to convert the first blank line and the resulting bit image line is copied the desired number of times.

LOOP TO DECODE ONE LINE

The main decoder loop decodes one line. It first tests to see whether any additional lines are to be decoded; if not, an exit from the loop occurs. This can occur because the compressed data stream was exhausted, the return to control sequence of several EOLs in a row was encountered, or the number of output lines requested has been decoded.

The procedure to decode a line into run ends is described in greater detail with reference to FIGS. 4.1 to 4.6.

If a bit image is desired, then the decoded run end representation must be converted to raster scan format. A preferred method for this conversion is given in J. L. Mitchell et al's previously cited U.S. Pat. No. 4,596,039. Alternately, the output image might be left in the form of many lines in run end point format. Such a representation could be readily reencoded. This makes conversion between the one and two-dimensional algorithms and the various options easier since the conversion to and from the raster image can be avoided.

The vertical scale parameter DVSCALE, if greater than one, causes duplicate copies of the output line to be created to produce a decoded image of higher resolution than the original image.

PAD LINES

Once the desired number of compressed lines have been decoded, extra lines are padded if DBOTPAD is positive. The same process of pointing to the desired color blank line used with DTOPPAD is used at the end of the image. DBOTPAD may be calculated at this point to maintain a fixed size image.

PROCEDURE TO DECODE ONE LINE

FIGS. 4.1 through 4.6 illustrate the steps required to decode one line into a run end point representation.

FIG. 4.1 shows the initialization required before decoding the data. RPST is assumed to be pointing to the area of storage where the run end buffer is to be created. The three halfwords following the halfword where the length is to be put are zeroed. RP is then reset to point to the place where the first decoded run end is to be stored. ROLD, the last run, is initialized to 0.

FLAG1D is examined to determine whether the next line is expected to be one- or two-dimensionally coded. (If the compressed data has an EOL code next, then either path may be chosen for the same result.) If the FLAG1D indicates one-dimensional coding (1), TP is set to point to the run length decode tables for white runs, and NXTTP is set to the run length decode tables for black runs. Control then passes to the loop which decodes runs using the run length decoding procedure.

If the line is to be decoded using the two-dimensional algorithm, HP is set to point to the first run end in the run end buffer describing the history line. Control then passes to the loop which decodes runs according to the two-dimensional algorithm.

FIG. 4.2 shows the inner loop for the two-dimensional scheme. This loop examines the next compressed data bit. If this bit is '1', a vertical reference 0 (V0) has been decoded. The history run end is saved in ROLD and the history buffer pointer HP is incremented to point to the next run end in the history line. A test is performed to determine whether the run end just decoded was at the right edge of the line being decoded; if so, the entire line has been decoded and an exit from the line decoding procedure occurs. Otherwise, the ROLD is saved as the run end just decoded, the run end pointer RP is updated to point to the next run to be decoded, and the process repeats.

The main loop is reentered in three places. The loop is entered at point A immediately after initialization, after a pair of runs has been run-length decoded in the two-dimensional algorithm, or after the PASS mode has been decoded. The other entry points are used after a nonzero vertical reference has been decoded. In those cases the last run end decoded is in ROLD; it must be saved at RO, and RP must be updated before testing the next bit. If the decoded run ended to the right of the history run, the loop is entered at point C, before the test to see if the right edge has been reached. If the decoded run ended to the left of the history run, then clearly the right edge has not been reached (since the line to be decoded has the same length as the history line), so the test for the right edge can be skipped and the loop reentered at B.

When the right edge of the image is reached, immediately before control is returned to the main loop in the decoder (described in FIG. 3), the pointer to the beginning of the run end buffer for the line just decoded (RPST) is copied to HPST so that the line will be available for use as a history line if the next line is to be decoded two-dimensionally. All other exits from the loop to decode a line also update HPST. Extra copies of the last (right edge) end point are made in the run end buffer at this time. The number of bytes in the run end buffer may optionally be stored at RLEN, the halfword pointed to by RPST.

If the bit tested in the main loop is nonzero, then additional bits are tested to identify the code word. This procedure for the vertical reference codes and PASS code is described in FIGS. 4.3 and 4.4. Successive bits are examined until a complete code word is identified.

When VL1 is decoded, ROLD is set one bit to the left of the history run end. The history pointer can be incremented (as in the encoder for VL1) and control returned to the main loop.

When VR1 is decoded, ROLD is set one bit to the right of the history run end. The history pointer is incremented to point to the next history run. This history run end is not to the left of the end of the run just decoded. A test must be made to ensure that it is in fact to the right of that run end. If it is not, then HP is incremented again. Control then returns to the main loop.

If the run length prefix is decoded, the table pointer is set to the correct color decode table using the same procedure to determine the color as was described in the encoder, NXTTP is set to the run length decode tables for the opposite color. A flag (RUN2) is set to 0 to indicate that the first run of the pair is being decoded. Control then passes to the loop which decodes runs using the run length decoding procedure.

If we decode a PASS ('0001'), we save the end point H2 as ROLD, point the history pointer at the next history end point of the same color as the run being decoded, and return control to the main loop.

FIG. 4.4 shows the continuation of the vertical reference decoding procedure.

If one of the four remaining vertical reference codes (VL2, VL3, VR2, or VR3) is decoded, then ROLD is calculated as the correct relationship to H0 and the history pointer is updated in the same way as during the encoding process. Control returns to the main loop.

The bit pattern of '0000001' is the prefix to the two-dimensional code extensions. The pattern for the same extensions during one-dimensional decoding is '000000001'. The table pointer for the '0000001' path is set to the point it would have reached if the one-dimensional decoder had processed the extension prefix and control is passed to the run length decode loop.

The bit pattern of '0000000' is expected to produce an EOL code. The table pointer for the '0000000' path is set to the point it would have reached if the one-dimensional decoder had processed these seven zeroes and control is passed to the run length decode loop.

FIG. 4.5 shows the procedure used to decode run lengths. This procedure is entered at the point Y immediately after the initializations for one-dimensional decoding of a line, after decoding a run length prefix, after decoding the prefix to the extensions, or after decoding the first seven zeros of the EOL.

This loop begins by decoding a run length. This process will be described in greater detail with reference to FIG. 4.6. If an EOL is decoded at the start of the line, then control is returned to point Z during the initialization process (FIG. 4.1). If an EOL is decoded at the end of a line, then exit from the line decoder occurs. Otherwise, after the run length has been decoded, ROLD has been incremented by the run length. Some updating must then be done and a decision made as to whether to decode another run length.

FLAG1D is tested to determine whether the current line is being decoded one-dimensionally. If it is, then the run end of the last run decoded is tested to determine whether the right edge of the image line has been reached; if it has, then the entire line has been decoded, and exit from the line decoder occurs. Otherwise, the table pointer TP is set to point to the run length tables for the opposite color (the color of the next run to be decoded), the run end just decoded and saved in ROLD is stored at RO, and the run end pointer RP is incremented to point to the next (unused) space in the run end buffer. Control then goes to the top of the loop to decode the new run length.

If the current line is being decoded two-dimensionally, the flag RUN2 is tested to determine if the run just decoded was the first or second run of a pair. If it was the first, then another run must be decoded using run lengths. RUN2 is set to one to indicate that the second run of the pair is being decoded, and then the same setup procedure used for one-dimensional coding is performed: TP is set to point to the run length tables for the opposite color, the run end just decoded and saved in ROLD is stored at RO, and the run end pointer is incremented to point to the next (unused) space in the run end buffer. Control then goes to the top of the loop to decode the new run length.

If the current line is being decoded two-dimensionally and the last run coded was the second run of a pair, then ROLD is tested to determine if the right edge of the line has been reached. If it has, an exit from the line decoder occurs. Otherwise the history pointer HP must be updated. Since it already points to a run of the correct color, updating consists of testing to see if the history run end pointed to by HP is to the right of the end of the run just decoded. If it is not, then HP is incremented to point to the next history run end of the same color, and that run end is tested. This process repeats until a history run end which is to the right of the end of the run just decoded is found. We are guaranteed that such a history run end exists since the run just decoded ends to the left of the right edge and we must eventually encounter a history run end which is on the right edge. Control then returns to the main loop for two-dimensional decoding.

FIG. 4.6 shows the procedure for decoding a run length. The bits are examined one at a time. If the next bit is a '1', then the table pointer TP is incremented to address the next entry. If this entry (TO) is less than X'80' then a complete code has not yet been identified and control returns to the top of the loop to test the next bit. If the bit tested is a '0', then the entry value (TO) is added to the table pointer to move it to the subtree of the code table for codes which begin with the bits already decoded, and the loop repeats.

If on either path, the table entry is not less than X'80', then a complete code word has been decoded. If the second most significant bit of the table entry is zero, then a terminating code has been decoded. The number of image bits represented by this code is obtained from the low order 6 bits of the table entry and added into ROLD. At this point, the decoding of the run length is complete. Otherwise, TO is tested to see if it is greater than X'E8'. If not, then a makeup code has been decoded. The number of image bits represented by this code is obtained by multiplying the value in the low order 6 bits of the table entry by 64 (this operation is implemented as a left shift) and added into ROLD. The table pointer TP has to be reset to the top of the same color run length tables. This is done by setting it to NXTTP and adding in the offset to get back to the original table. Control then returns to the top of the loop to decode another makeup or terminating code word.

If the table entry is greater than X'E8', then an EOL has been decoded. If the Modified Huffman algorithm is not being used then it is necessary to decode the tag bit and set FLAG1D to indicate whether the next line is one- or two-dimensionally coded. ROLD is then tested to determine whether the EOL was encountered at the start or end of the line. If it occurred at the end of the line, then exit occurs from the line decode procedure. If it occurred at the start of a line, control returns to point Z in the initialization process (FIG. 4.1).

This description assumes that no invalid code words will occur in the compressed data and that uncompressed mode was not used in the encoder. Instead of interpreting all table entries greater than X'E8' as EOLs, the appropriate tests and error handling procedures can be implemented to detect invalid codes flagged by X'Ex'. If the uncompressed mode extension X'Fx' is found, a person skilled in the art could extend the procedure to decode uncompressed mode code words.

A further modification of the present invention can be accomplished as follows. The previously described encoding method assumes that an image to be encoded is available in raster form, in which case some clipping or padding of image pels may be done before encoding, or in run representation form, in which case it is to be encoded exactly as represented. Similarly, the decoding process creates either a raster image which may be a modified representation of the encoded image or an image in run representation form which exactly represents the encoded image. No method is provided to modify an image in run representation form prior to encoding or after decoding. This embodiment describes a system and method for performing such a modification. The description assumes that both the input and output image lines are represented in the run end form previously described; however, this algorithm may be modified to generate other run representations of image data (e.g. a run length representation).

The run end representation dealt with in the foregoing system describes an image as a series of lines of raster data, each represented by a vector of run ends. The run ends are the displacements in bits (i.e. pels) from the left edge of the image to the last pel in each run. Each vector consists of a series of halfwords. The 16 bits in the halfword are adequate to represent images with widths up to 32K as positive displacements. The first halfword in each line buffer gives the number of bytes of run end data plus two bytes for the count (i.e. the total number of bytes of data in the buffer); this is followed by three zero run ends, an arbitrary number of pairs of white/black run ends, and two additional copies of the last black run end. If the image row begins with a black run, the first white run end must be specified as zero. If the image row ends with a white run, the last black run end will be the same as the last white run end, so that there are in fact three additional copies of the last real run end. For example, the three-line bit image

```
11111111 11000000 00000000 00010000
00000000 00000000 00000000 00000000
10100000 10001111 11111111 11110001
``` would correspond to three vectors with the following halfword entries:

```
24 0 0 0   0 10 27 28 32 32 32 32
16 0 0 0 32 32 32 32
32 0 0 0   0  1  2  3  8  9 12 28 31 32 32 32
```

When an image is represented in this manner, the clipping and padding operations on the top and bottom of the image are simple: to clip, lines are discarded, and to pad, run end representations of empty lines may be easily created. In order to clip or pad on the left or right edges, it is necessary to modify the run end buffers describing image lines.

Suppose that the available run end representations describe input lines NI pels in width, and it is required that LCLIP and RCLIP pels be clipped from the left and right edges, respectively, and that LPAD and RPAD pels of a specified binary value (representing black or white) be added to the left and right edges, respectively. It may be assumed that LCLIP+RCLIP is less than NI and that NI, LCLIP, RCLIP, LPAD, and RPAD are all nonnegative. The modified run end representations will describe image lines of width NO=NI+(LPAD+RPAD)−(LCLIP+RCLIP); the total number of input pels represented in each line is NCOL=NI−(LCLIP+RCLIP).

The procedure for creating a modified run end representation in an output area from an original run end representation will be described with reference to FIGS. 5 and 6. This description assumes that there are pointers IPT and OPT addressing the input and output run end buffers, respectively. The white and black run ends addressed by IPT are referred to as IWRE and IBRE, respectively; the first four run ends addressed by OPT are referred to as OWRE, OBRE, OWRE1, and OBRE1.

Figure 5:
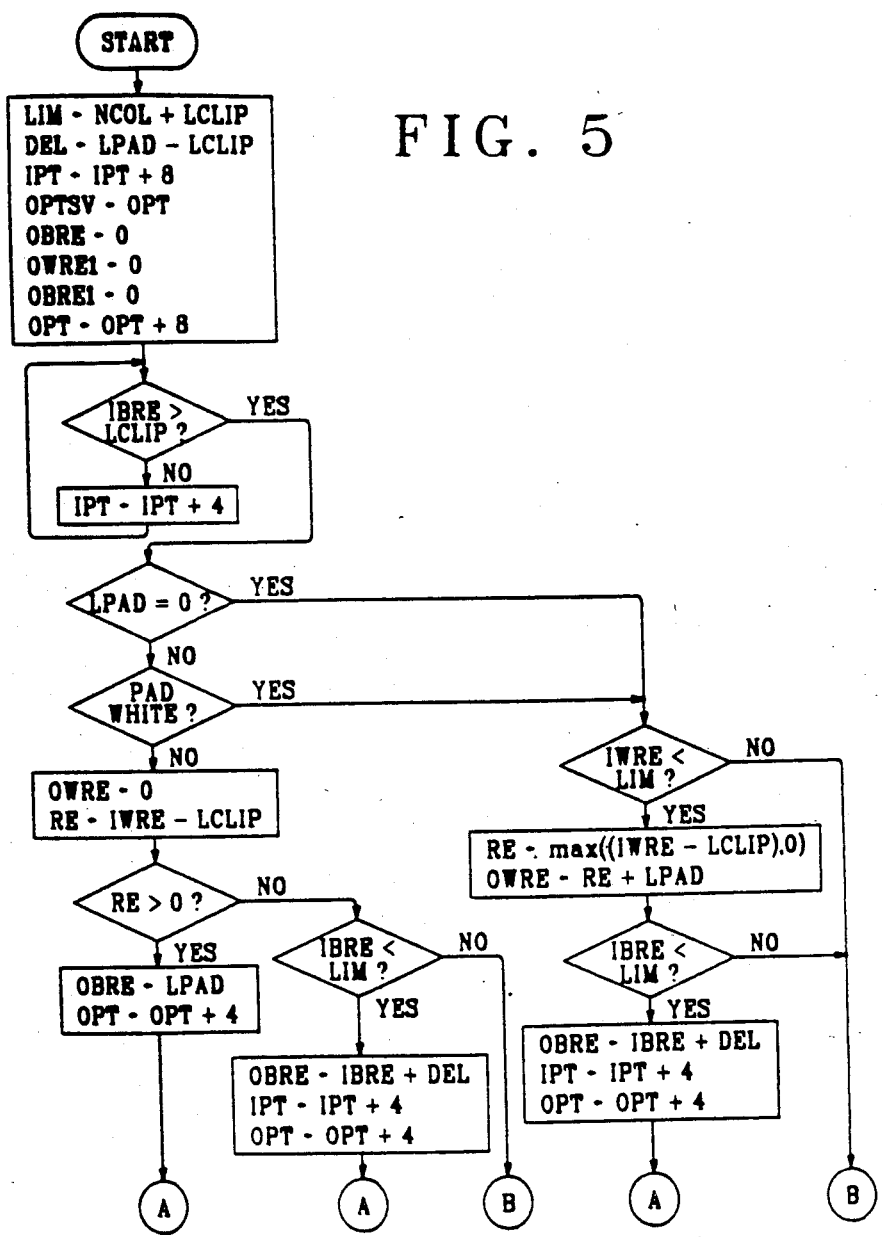
FIG. 5 is a flow diagram showing the initialization required for the run end modification process.

As will be seen in FIG. 5, the first step of the method is to set up two quantities used in the conversion calculation. LIM is the pel position in the input line of the last pel which will be required for the output line. It is the sum of the number of input pels to be used and the number to be clipped on the left. DEL is the amount by which each input run end must be increased as the input run ends are transferred to the output buffer. It is the difference between the number of padding pels being added on the left and the number of original pels being discarded.

The input pointer JPT is incremented to skip over the buffer length and the initial three zero entries. The value of the output pointer OPT is saved for later use in setting up the buffer length. The initial three zero run ends are set up in the output buffer, leaving space for the buffer length before them, and the output pointer is incremented to address the next available element.

A loop is then entered that locates the first input run end pair which will be used. This is done by skipping over black/white run end pairs in the input buffer until one is found whose black run end exceeds the number of input pels to be discarded on the left. Data from the run of black pels will be represented in the output buffer; data from the preceding white run may or may not be, depending on whether or not the white run end exceeds LCLIP.

The padding pels, if any, are combined with the indicated run end data to create the first pair of non-zero run ends in the output buffer. This process divides into several cases.

If the left edge is to be padded with black pels (i.e. LPAD is greater than zero and black padding is specified), then a white run end of zero is stored in the output buffer. The input white run end is then adjusted by the number of pels to be clipped. If the result is greater than zero, then the first input pel to be used is white. In this case a black run end equal to the number of pad bits is stored, the output pointer OPT is incremented to address the next white/black run end pair in the output buffer, and processing continues to the main loop, which will adjust and transfer the white and black run ends addressed by IPT. If the adjusted white run end is less than zero, then the first input pel to be used is black. If the black run end extends to or beyond the last input pel to be used, then the main loop is bypassed; otherwise the black run end is adjusted and stored, the input and output pointers are incremented to address the next run end pairs, and processing continues to the main loop.

If the padding on the left is white or if there is no padding, the white run end in the input buffer is compared to LIM to see if the white run extends to or beyond the end of the input data to be used. If IWRE is greater than or equal to LIM then this is the case, and the main loop is bypassed. Otherwise the white run end is decreased by the number of pels clipped. If the resulting run end is less than zero, it is reset to zero, indicating that the input data to be used begins with a black pel. The adjusted run end is added to the number of padding pels to obtain the first output white run end. The black run end is then compared to LIM. If it is greater than or equal to LIM (i.e. the black run extends to or beyond the last input pel to be used) then the main loop is bypassed; otherwise the black run end is adjusted and stored in the output buffer, the input and output pointers are incremented to address the next run end pairs, and processing continues to the main loop.

Figure 6:
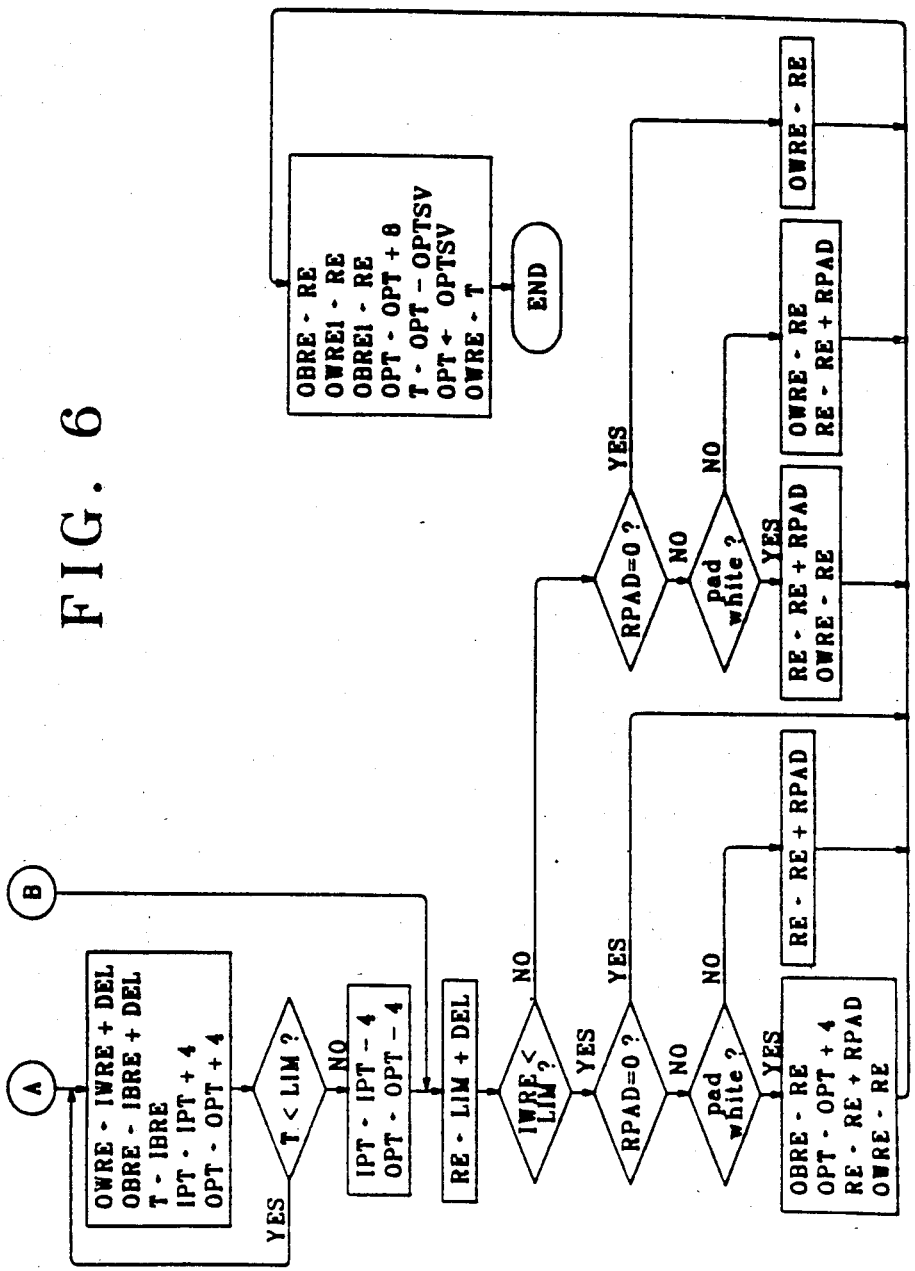
FIG. 6 is a flow diagram illustrating the run end modification process.

Referring now to FIG. 6, the main loop transfers successive pairs of run ends from the input buffer to the output buffer, adjusting each run end by DEL. After a run end pair is transferred, the black run end is saved temporarily in a variable "T" while the input and output pointers are incremented to address the next run end pairs. The saved black run end is then compared to LIM. If it is smaller than LIM, then the loop is repeated. Otherwise the end of the input data to be used has been reached. The input and output pointers are backed up to address the last run end pair transferred. This completes the main loop processing which is bypassed in some cases, as described above.

The final process is that of creating the representation of the right edge and any padding required. At this point the input pointer JPT addresses the last input run end pair used, and the output pointer OPT addresses a run end pair in which the white run end has already been set up unless the portion of the input line to be used consisted of all white data, in which case the white run end is modified by the right edge processing (because the input line ends with a white pel as will be explained below). The right edge processing begins by setting up the position of the end of the input data in the output line. This value is the sum of the input limit LIM and the run end adjustment value DEL.

The last white run end processed is then compared to LIM. If it is less than LIM, then the last input pel to be used is black. If white pad bits are to be inserted on the right edge, then the position representing the end of the input data is stored as a black run end and the output pointer is incremented to address the next run end pair. The edge position is then increased by the number of padding bits required, and the result is stored as a white run end. Processing continues with the terminating section, which stores three copies of the last run end and calculates and stores the length of the output buffer. If the right edge is to be padded with black bits, then the number of padding bits is added to the edge position to obtain the position of the right edge of the padded output image. The termination code will store this value as the final black run end and two additional copies of that run end. If there is no padding on the right the procedure is the same except that it is not necessary to increase the edge position by RPAD (since adding zero does not change the value of the edge position).

If the last white run end processed is not less than LIM, then the last input pel to be used is white. In this case it is necessary to modify the last white run end stored, since it may represent a run extending beyond the number of input pels to be transferred. If the image is to be padded on the right with white pels, then the number of padding pels is added to the position representing the end of the input data and the result is stored as the modified white run end. The termination code will add three additional copies of this value. If the image is to be padded on the right with black pels, the position representing the end of the input data is stored as a white run end and the number of padding pels is added to that value to obtain the position of the end of the black (padding) run. The termination code stores the black run end and two additional copies. The case where the right edge is not to be padded is equivalent to padding with white pels and RPAD=0, so the operation is the same as for that case except that the addition of RPAD to obtain the final run end position can be omitted.

The terminating code, as described above, stores the last black run end and two additional copies of that run end. The length of the output buffer is calculated as follows: first the output pointer OPT is incremented to address the end of the output buffer. The address of the beginning of the buffer is subtracted from this address to obtain the buffer length. OPT is then reloaded with the address of the beginning of the buffer, and the length is stored as the first buffer entry (addressed as OWRE).

In addition, manipulation of the right and left padding values may be used to shear an image prior to encoding or after decoding. A sheared image is one in which a varying number of pels is inserted before the beginning of each line, and pels are added to the end of the line to keep the image width constant. For a shearing operation which transforms the original rectangular image into a parallelogram, the number of pels inserted either increases linearly going from the top of the image to the bottom. The padding values are used to control the number of pels inserted, hence the amount of shearing. In normal operation of the system the padding values are kept constant, so no shearing occurs. However, if it is desired (for example) to shear a 2000-line image by 45 degrees, then the padding values may be modified as follows:

| For encoding or decoding line | Left pad | Right pad |
| --- | --- | --- |
|  | 0 | 1999 |
| 2 | 1 | 1998 |
| 3 | 2 | 1997 |
| 4 | 3 | 1996 |
| . |  |  |
| 1999 | 1998 | 1 |
| 2000 | 1999 | 0 |

The number of pels to be skipped on the left edge and the total number of input pels to be used may also come into play if it is necessary to trim off part of the sheared image. Suppose, for example, that it is necessary to trim three pels from the left edge of the sheared image generated as described above and two pels from the right edge. In this case the number of padding pels on the left is calculated as the difference between the left pad and the number of pels to be skipped; it is held at zero while the difference is negative and then increases linearly to 1996 rather than running from 0 to 1999. The number of input image pels used remains at N, where N is the image width, except for the first three lines and the last two lines, when it is reduced to trim off the excess pels as required.

| For Encoding or decoding line | Left pad | x skip | Right pad | No. input pels used |
| --- | --- | --- | --- | --- |
| 1 | 0 | 3 | 1997 | N-3 |
| 2 | 0 | 2 | 1996 | N-2 |
| 3 | 0 | 1 | 1995 | N-1 |
| 4 | 0 | 0 | 1994 | N |
| 5 | 1 | 0 | 1993 | N |
| 6 | 2 | 0 | 1992 | N |
| 7 | 3 | 0 | 1991 | N |
| . |  |  |  |  |
| 1997 | 1993 | 0 | 1 | N |
| 1998 | 1994 | 0 | 0 | N |
| 1999 | 1995 | 0 | 0 | N-1 |
| 2000 | 1996 | 0 | 0 | N-2 |

The shearing method described above may be applied to an image stored in run representation form, regardless of whether it is being encoded or decoded. To shear a line of an image represented in run end form, for example, it is necessary only to modify the run ends describing the data at the ends of the line (clipping or padding as necessary) and then add a constant value (the difference between the number of pels to pad on the left and the number of pels to skip on the left) to the remaining run ends.

Thus, while the invention has been described with reference to preferred embodiments thereof, it will be understood by those skilled in the art that various changes in form and details may be made without departing from the scope of the invention.

What is claimed is:

1. A method for encoding a binary digital image constituted by strings of bits of one or the other binary value, comprising the steps of:
   dividing said image into lines of bits containing digital information indicative of said binary values;
   representing the digital information on each of said lines as a list of run ends, each list being indicative of the respective offsets from the beginning of a given line to the last bit in each string of bits of identical value in said given line; and
   encoding said line representations by the steps comprising:
      testing each run end on a given line for a predetermined relationship with another run end on at least one adjacent line;
      generating directly a reference code word representative of said predetermined relationship for each successful test;
      generating a run code word for the difference between said run end and the immediately preceding run end on the same line for each case where no predetermined relationship is found; and
      merging said reference code words and said run code words generated by the above steps to form an encoded data stream; and
   repeating said representing and encoding steps on other image lines to code the lines of the image in sequence.

2. A method according to claim 1 wherein said line representations are stored in a run end buffer and each line representation contains a plurality of run representations of 0 at the beginning of the buffer.

3. A method according to claim 1 wherein said line representations are stored in a run end buffer and each line representation contains a plurality of copies of the last run end at the end of the buffer.

4. A method according to claim 1 wherein said line representations are stored in a run end buffer and each line representation contains an indication of the number of run ends contained in the run end buffer.

5. A method according to claim 1 wherein the binary value of the bits in the string of bits described by the first run end in a given line representation list is determined, and the binary value of the bits of the run for which a run end is being encoded is determined by examination of the position of said run end in said given list of run ends.

6. A method according to claim 1, further comprising the step of encoding pad lines.

7. A method according to claim 1, further comprising the step of skipping lines with digital information during the encoding step.

8. A method according to claim 1 further comprising the step of changing the vertical size of an image during the encoding step.

9. A method according to claim 1 wherein said digital image is divided into lines of equal length, and further comprising the steps of testing to determine if the end of an image line has been reached and performing said testing only if a run end being encoded has not been determined to be less than a run end on an adjacent line.

10. A method for decoding a data stream representing a binary digital image constituted by strings of bits of one or the other binary value and encoded as a series of image lines containing information indicative of the run ends of said strings, said information comprising at least one of (1) run code words indicative of the difference between successive run ends, and (2) reference codes indicating a predetermined relationship between a run end in one line and another run end on at least one adjacent line, comprising the steps of:
   decoding said data stream into representations of said lines, said representations each comprising a list of run ends, each list being indicative of the respective offsets from the beginning of a given line to the last bit in each string of bits of identical value in said given line, and wherein said decoding comprises the steps of:
      testing the first line representation in said encoded data stream during decoding for a reference code indicating a predetermined relationship between the run end currently being decoded and another run end on at least one adjacent line;
      decoding directly a predetermined relationship from said reference code for each successful test; and
      decoding a run code word indicative of the difference between said run end and the immediately preceding run end on the same line for each unsuccessful test; and
   repeating said data stream decoding step to decoding step to decode the remaining lines of said image.

11. A method as in claim 10 further comprising the step of converting said representations of said image lines to bit map form.

12. A method as in claim 10 wherein said lines have been encoded without creating a bit map representation of said image.

13. A method as in claim 10 wherein said line representations are stored in a run end buffer and each line representation contains a plurality of run representations of 0 at the beginning of the buffer.

14. A method according to claim 10 wherein said line representations are stored in a run end buffer and each line representation contains a plurality of copies of the last run end at the end of the buffer.

15. A method according to claim 10 wherein said line representations are stored in a run end buffer and each line representation contains an indication of the number of run ends contained in the run end buffer.

16. A method according to claim 10 further comprising the step of omitting selected lines in the encoded image by omitting their representations from the decoded data stream, so that said selected lines do not appear in the final decoded image and wherein said selected lines are specified by operator control.

17. A method according to claim 10 further comprising the step during decoding of changing the vertical size of an image as it is decoded in response to operator control.

18. A method according to claim 10 wherein the binary value of the bits in the string of bits described by the first run end in a given line representation list is determined, and the binary value of the bits of the run for which a run end is being decoded is determined by examination of the position of said run end in said given list of run ends.

19. A method according to claim 10, further comprising the step of creating pad lines in the decoded line representations.

20. A method according to claim 13 wherein said digital image is divided into lines of equal length, and further comprising the steps of testing to determine if the end of an image line has been reached and performing said testing only if a run end being decoded has not been determined to be less than a run end on an adjacent line.

21. A method for modifying a line in a binary image to remove predetermined numbers of pels from the beginning and end of said line and to add predetermined numbers of pels of selected binary value to the beginning and end of said line, comprising the steps of:
representing the digital information in said line as a list of run ends in the form of offsets from the beginning of said line to the last bit in each string of bits of identical value in said line;
storing said run ends representing said line in a run end buffer;
modifying said stored line representation by the steps of:
calculating the net number of pels D to be added to the beginning of the line by subtracting the predetermined number of pels to be removed from the beginning of the line from the predetermined number of pels of a selected binary value to be added to the beginning of the line;
calculating a limit L as the sum of the number of pels of said stored line which are to be represented in the modified line and said predetermined number of pels to be removed from the beginning of the line;
indexing through said line representation until a run end is found which exceeds said predetermined number of pels to be removed from the beginning of the line;
if said predetermined number of pels to be added to the beginning of the line is not zero and said found run end describes a run of pels of different binary value from that of said pels to be added to the beginning of the line, storing a representation of the number of said pels to be added to the beginning of the line in an output run representation buffer; then
beginning with said found run end, adding the net number of pels to be added D to each remaining run end and storing the results successively in said output run representation buffer, until a run end is found which equals or exceeds the limit L, whereupon said adding and storing is ceased;
if said predetermined number of pels to be added to the end of the line is not zero and said run end which equals or exceeds the limit L describes a run of pels of different binary value from that of said pels to be added to the end of the line, storing the sum of L and D in said output run representation buffer; and then
storing the sum of L, D, and said number of pels to be added to the end of the line in said output run representation buffer.

22. A system for encoding a binary digital image constituted by strings of bits of one or the other binary value, comprising:
means for dividing said image into lines of bits containing digital information indicative of said binary values;
means for representing the digital information on each of said lines as a list of run ends, each list being indicative of the respective offsets from the beginning of a given line to the last bit in each string of bits of identical value in said given line; and
means for encoding said line representations, said encoding means comprising:
means for testing each run end on a given line for a predetermined relationship with another run end on at least one adjacent line;
means for generating directly a reference code word representative of said predetermined relationship for each successful test;
means for generating a run code word for the difference between said run end and the immediately preceding run end on the same line for each case where no predetermined relationship is found:
means for merging said reference code words and said run code words generated by said respective generating means to form an encoded data stream; and
means for repeatedly activating said representing and encoding means to operate on other image lines to code the lines of the image in sequence.

23. A system according to claim 22, further comprising means for encoding pad lines.

24. A system according to claim 22, further comprising means for skipping data lines during the encoding process.

25. A system according to claim 22, further comprising means for changing the vertical size of an image as it is encoded.

26. A system according to claim 22 wherein said digital image is divided into lines of equal length, and further comprising means for testing to determine if the end of an image line has been reached, and means for omitting said testing if a run end being encoded is determined to be less than a run end on an adjacent line.

27. A system for decoding a data stream representing a binary digital image consituted by strings of bits of one or the other binary value and encoded as a series of image lines containing information indicative of the run ends of said strings, said information comprising at least one of (1) run code words indicative of the difference between successive run ends, and (2) reference codes indicating a predetermined relationship between a run end in one line and another run end on at least one adjacent line, comprising:
means for decoding said data stream into representations of said lines wherein said representations each comprise a list of run ends, each list being indicative of the respective offsets from the beginning of a given line to the last bit in each string of bits of identical value in said given line, and wherein said decoding means comprises:
means for testing the first line representation in said encoded data stream during decoding for a reference code indicating a predetermined relationship between the run end currently being decoded and another run end on at least one adjacent line;

means for decoding directly a predetermined relationship from said reference code for each successful test; and means for decoding a run code word indicative of the difference between said run end and the immediately preceding run end on the same line for each unsuccessful test; and means for repeatedly activating said data stream decoder means to decode the remaining lines of said image.

28. A system according to claim 27 wherein said digital image is divided into lines of equal length, and further comprising means for testing to determine if the end of an image line has been reached, and means for omitting said testing if a run end being decoded is determined to be less than a run end on an adjacent line.

29. A system as in claim 27, further comprising means for converting said representations of said image lines to bit map form.

30. A system according to claim 27, further comprising means, under operator control, for omitting lines described in the encoded image from the final decoded image as specified by operator control.

31. A system according to claim 27, further comprising means, under operator control, for changing the vertical size of an image as it is decoded as specified by operator control.

32. A system according to claim 27, further comprising means for creating pad lines in the decoded data.

33. A system for modifying a line in a binary image to remove predetermined numbers of pels from the beginning and end of said line and to add predetermined numbers of pels of selected binary value to the beginning and end of said line, comprising:

means for representing the digital information in said line as a list of run ends in the form of offsets from the beginning of said line to the last bit in each string of bits of identical value in said line;

run end buffer means for storing said run ends representing said line as a stored line representation;

an output run representation buffer; and means for modifying said stored line representation by the steps of:

calculating the net number of pels D to be added to the beginning of the line by subtracting the predetermined number of pels to be removed from the beginning of the line from the predetermined number of pels of a selected binary value to be added to the beginning of the line;

calculating a limit L as the sum of the number of pels of said stored line which are to be represented in the modified line and said predetermined number of pels to be removed from the beginning of the line;

indexing through said line representation until a run end is found which exceeds said predetermined number of pels to be removed from the beginning of the line;

if said predetermined number of pels to be added to the beginning of the line is not zero and said found run end describes a run of pels of different binary value from that of said pels to be added to the beginning of the line, storing a representation of the number of said pels to be added to the beginning of the line in said output run representation buffer; then beginning with said found run end, adding the net number of pels to be added D to each remaining run end and storing the results successively in said output run representation buffer, until a run end is found which equals or exceeds the limit L, whereupon said adding and storing is ceased;

if said predetermined number of pels to be added to the end of the line is not zero and said run end which equals or exceeds the limit L describes a run of pels of different binary value from that of said pels to be added to the end of the line, storing the sum of L and D in said output run representation buffer; and then storing the sum of L, D, and said number of pels to be added to the end of the line in said output run representation buffer.

* * * * *